United States Patent
Sattler

(10) Patent No.: US 12,044,690 B2
(45) Date of Patent: Jul. 23, 2024

(54) AUTOMATIC ANALYZER

(71) Applicant: Roche Diagnostics Operations, Inc., Indianapolis, IN (US)

(72) Inventor: Stephan Sattler, Starnberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 828 days.

(21) Appl. No.: 17/113,651

(22) Filed: Dec. 7, 2020

(65) Prior Publication Data
US 2021/0088543 A1 Mar. 25, 2021

Related U.S. Application Data

(63) Continuation of application No. PCT/EP2019/067189, filed on Jun. 27, 2019.

(30) Foreign Application Priority Data

Jun. 29, 2018 (EP) ..................................... 18180862

(51) Int. Cl.
*G01N 35/04* (2006.01)
*B01L 9/00* (2006.01)
(Continued)

(52) U.S. Cl.
CPC .............. *G01N 35/04* (2013.01); *B01L 9/543* (2013.01); *G01N 35/00732* (2013.01);
(Continued)

(58) Field of Classification Search
CPC ............ G01N 35/04; G01N 35/00732; G01N 35/026; G01N 2035/00742;
(Continued)

(56) References Cited

U.S. PATENT DOCUMENTS

| 7,360,984 B1 * | 4/2008 | Sugiyama | G01N 35/04 |
| | | | 422/65 |
| 9,164,114 B2 * | 10/2015 | Baumann | G01N 35/04 |

(Continued)

FOREIGN PATENT DOCUMENTS

| EP | 1275966 A1 | 1/2003 |
| EP | 2455765 A1 | 5/2012 |

(Continued)

OTHER PUBLICATIONS

International Search Report dated Sep. 23, 2019, in Application No. PCT/EP2019/067189, 3 pp.

*Primary Examiner* — Jennifer Wecker
*Assistant Examiner* — Kathryn Elizabeth Limbaugh
(74) *Attorney, Agent, or Firm* — Taft Stettinius & Hollister LLP

(57) ABSTRACT

An automatic analyzer for analyzing samples includes a lift, a part take-out station and a rack recovery station. The lift is configured to raise and lower a plurality of stacked part racks to the part take-out station and to the rack recovery station while keeping the part racks together. The part take-out station comprises a first rack separator configured to prevent the uppermost one of said stacked part racks from being lowered when the lift lowers, while allowing the other part racks to lower, so that the uppermost rack is separated from the other part racks so as to remain in the part take-out station. The rack recovery station comprises a second rack separator configured to prevent the uppermost one of said stacked part racks from being lowered when said lift lowers, while allowing the other part racks to lower, so as to remain in the rack recovery station.

12 Claims, 13 Drawing Sheets

(51) Int. Cl.
*G01N 35/00* (2006.01)
*G01N 35/02* (2006.01)

(52) U.S. Cl.
CPC ........ *G01N 35/026* (2013.01); *B01L 2200/18* (2013.01); *B01L 2300/021* (2013.01); *G01N 2035/00742* (2013.01); *G01N 2035/0425* (2013.01); *G01N 2035/0427* (2013.01)

(58) Field of Classification Search
CPC .... G01N 2035/0425; G01N 2035/0427; B01L 9/453; B01L 2200/18; B01L 2300/021
See application file for complete search history.

(56) References Cited

U.S. PATENT DOCUMENTS

| | | |
|---|---|---|
| 2003/0221914 A1 | 12/2003 | Smith et al. |
| 2008/0028835 A1 | 2/2008 | Higuchi |
| 2016/0297612 A1 | 10/2016 | Sasamoto et al. |

FOREIGN PATENT DOCUMENTS

| | | |
|---|---|---|
| JP | 2014-126392 A | 7/2014 |
| JP | 2016-199399 A | 12/2016 |
| WO | 2017/163607 A1 | 9/2017 |

\* cited by examiner

AUTOMATIC ANALYZER

CROSS-REFERENCE TO RELATED APPLICATIONS

This application is a continuation of International Patent Application No. PCT/EP2019/067189, filed 27 Jun. 2019, which claims the benefit of European Patent Application No. 18180862.7, filed 29 Jun. 2018, the disclosures of which are hereby incorporated by reference in their entirety.

TECHNICAL FIELD

The present disclosure relates to an automatic analyzer using disposable parts used in contact with samples.

BACKGROUND

In vitro diagnostic testing has a major effect on clinical decisions, providing physicians with pivotal information. Particularly, there is great emphasis on providing quick and accurate test results in critical care settings. In vitro diagnostic testing is usually performed using instruments operable to execute one or more processing steps/workflow steps on one or more biological samples and/or one or more reagents, such as pre-analytical instruments, post-analytical instruments and also analytical instruments.

Analytical instruments/analyzers are configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical instrument may comprise units assisting with the pipetting, dosing, and mixing of samples and/or reagents.

The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis.

Examples of such analyzer are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

By treating and measuring living samples such as blood plasma, serum, or urine using various reagents, measured information is obtained which is beneficial for various types of analysis items such as biochemical, immunological, or genetic analysis items. Then, if contamination between the samples must be severely prevented as in the case with the immunological or genetic analysis items, disposable nozzles tips are used. Further, for the same reason, disposable reaction containers may be used to mix the samples and reagents together or to dilute a sample. By using disposable parts as the nozzle tips and reaction containers, which are brought into contact with the samples, the contamination between the samples or inappropriate inspection data resulting from carryover is reduced.

SUMMARY

It is against the above background that the embodiments of the present disclosure provide certain unobvious advantages and advancements over the prior art. In particular, the inventors have recognized a need for improvements in automatic analyzers.

Although the embodiments of the present disclosure are not limited to specific advantages or functionality, it is noted that the automatic analyzer aims to reduce the space necessary for the stacks of unused and used part racks, to reduce the number of drives for driving the stacks of part racks and to reduce the volume for a drawer assembly of the lift that can be pulled-out for replacement of part racks.

In accordance with one embodiment of the present disclosure, an automatic analyzer for analyzing samples using disposable parts is provided comprising a lift, a part take-out station and a rack recovery station, wherein the rack recovery station is arranged above the part take-out station, wherein the lift is configured to raise and lower a plurality of stacked part racks to the part takeout station while keeping the part racks together and to the rack recovery station while keeping the part racks together, wherein the part take-out station comprises a first rack separator configured to prevent the uppermost one of said stacked part racks from being lowered when said lift lowers, while allowing the other part racks to lower, so that the uppermost rack is separated from the other part racks so as to remain in the part take-out station, wherein the rack recovery station comprises a second rack separator configured to prevent the uppermost one of said stacked part racks from being lowered when said lift lowers, while allowing the other part racks to lower, so that the uppermost rack is separated from the other part racks so as to remain in the rack recovery station.

These and other features and advantages of the embodiments of the present disclosure will be more fully understood from the following detailed description taken together with the accompanying claims. It is noted that the scope of the claims is defined by the recitations herein and not by the specific discussion of features and advantages set forth in the present description.

Figure 1:
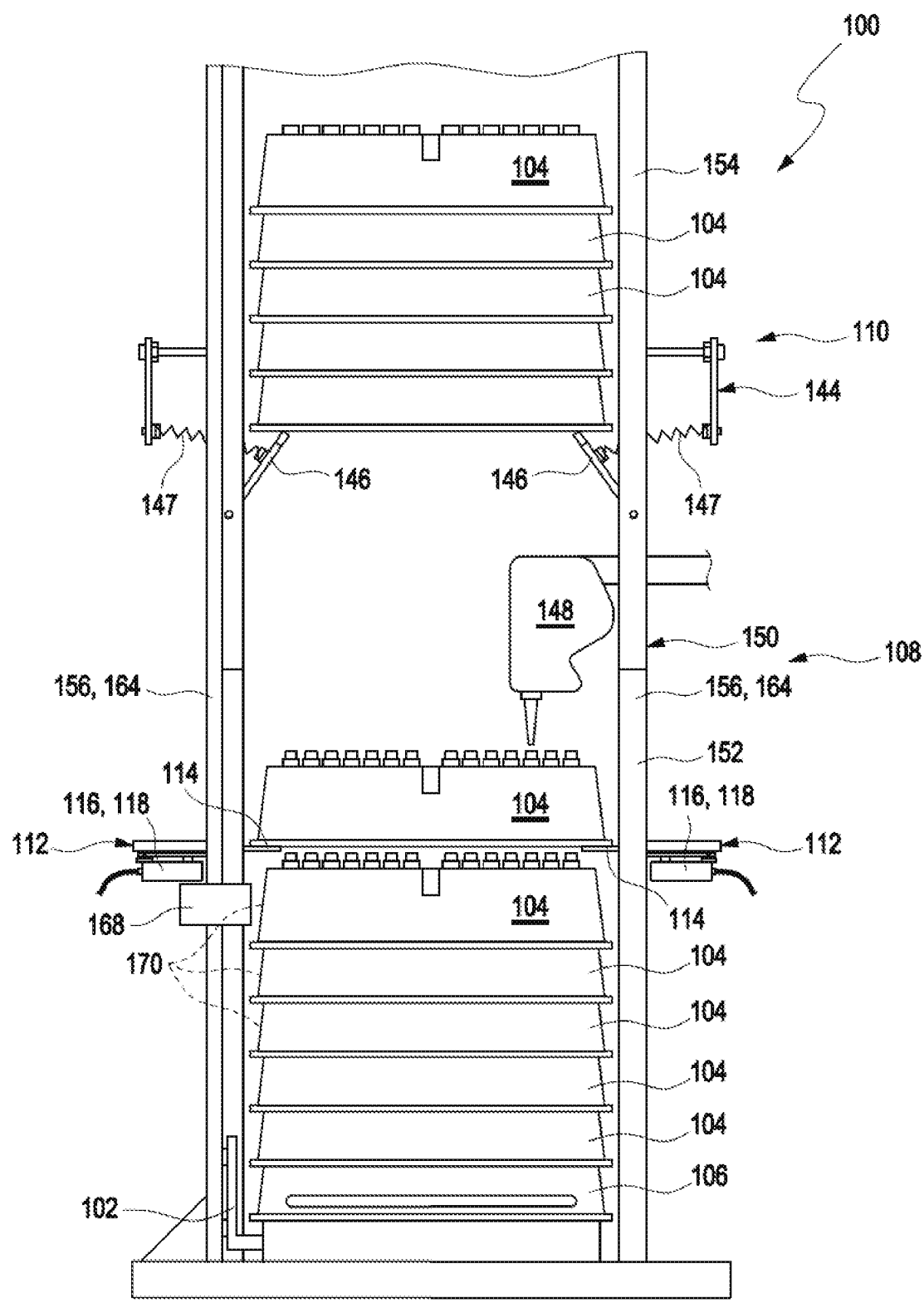
FIG. 1 shows a front view of an automatic analyzer.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly", "more particularly", "specifically", "more specifically" or similar terms are used in conjunction with additional/alternative features, without restricting alternative possibilities. Thus, features introduced by these terms are additional/alternative features and are not intended to restrict the scope of the claims in any way. The embodiments of the disclosure may, as the skilled person will recognize, be performed by using alternative features. Similarly, features introduced by "in an embodiment of the disclosure" or similar expressions are intended to be additional/alternative features, without any restriction regarding alternative embodiments of the disclosure, without any restrictions regarding the scope of the disclosure and without any restriction regarding the possibility of combining the features introduced in such way with other additional/alternative or non-additional/alternative features of the disclosure.

According to the disclosed automatic analyzer, the automatic analyzer for analyzing samples using disposable parts comprises a lift, a part take-out station and a rack recovery station. The rack recovery station is arranged above the part take-out station. The lift is configured to raise and lower a plurality of stacked part racks to and from the part take-out station while keeping the part racks together. The lift is configured to raise and lower a plurality of stacked part racks to and from the rack recovery station while keeping the part racks together. The part take-out station comprises a first rack separator configured to prevent the uppermost one of said stacked part racks from being lowered when said lift lowers, while allowing the other part racks to lower, so that the uppermost rack is separated from the other part racks so as to remain in the part take-out station. The rack recovery station comprises a second rack separator configured to prevent the uppermost one of said stacked part racks from being lowered when said lift lowers, while allowing the other part racks to lower, so that the uppermost rack is separated from the other part racks so as to remain in the rack recovery station. Thus, contrary to the construction of EP 1 275 966 A1, the used part racks are not provided as a stack next to the stack of unused part racks but are transported to a position above the stack of unused part racks. As the used part racks are transported with the lift which also transports the unused part racks, a drive for the lateral transport of the used part racks can be omitted. Further, an additional lift for raising and lowering the used racks next to the lift for raising and lowering the unused racks can be omitted. Furthermore, a space necessary for storing the used part racks laterally next to the unused racks can be avoided. Particularly, just a single drive for moving the lift is required such that the number of drives is reduced to the minimum.

The term "automatic analyzer" as used herein is a broad term and is to be given its ordinary and customary meaning to a person of ordinary skill in the art and is not to be limited to a special or customized meaning. The term specifically may refer, without limitation, to any apparatus or apparatus component operable to execute one or more processing steps/workflow steps on one or more biological samples and/or reagents. The term "processing step" thereby refers to physically executed processing steps such as centrifugation, aliquotation, sample analysis and the like. The term "analyzer" covers pre-analytical sample work-cells, post-analytical sample work-cells and also analytical work-cells.

The term "disposable part" as used herein is a broad term and is to be given its ordinary and customary meaning to a person of ordinary skill in the art and is not to be limited to a special or customized meaning. The term specifically may refer, without limitation, to disposable nozzle tips and/or reaction containers.

The term "part rack" as used herein is a broad term and is to be given its ordinary and customary meaning to a person of ordinary skill in the art and is not to be limited to a special or customized meaning. The term specifically may refer, without limitation, to any container in which disposable parts are two-dimensionally arranged. For example, part racks have a large number of nozzle tips two-dimensionally arranged therein or have a large number of reaction containers two-dimensionally arranged therein. These part racks are so configured to be simply placed in a rack field, and a transportation device takes out nozzle tips or reaction containers from the corresponding rack in a subsequent order.

The first rack separator may comprise a pair of opposing preventing members configured to prevent the uppermost one of said stacked part racks from being lowered when said lift lowers. Thus, a part rack from which the parts are to be taken out can be separated from the remaining part racks. Needless to say, first rack separator is configured to move the preventing members to a position where the uppermost one of said stacked part racks is not prevented from being lowered when said lift lowers but the stack of part racks is allowed to pass the preventing members.

Such an operation may be of interest for different purposes such as for identifying the part racks by means of a scanner or the like.

The preventing members may be moveable in a direction perpendicular to a direction in which the lift is moveable. Thus, a conflict of the movements of the lift and the preventing members is avoided. Further, the drive for the preventing members may be simplified.

The part racks may comprise at least two opposing side walls, wherein the preventing members are configured to engage a lower rim of the two opposing side walls. Thereby, the preventing members may reliably separate the part rack from the stack of part racks.

The lower rim of the at least two opposing side walls may comprise protrusions, wherein the preventing members are configured to engage the protrusions. Thereby, the preventing members may reliably engage with the part rack.

The automatic analyzer may further comprise a drive mechanism configured to concertedly move the preventing members. Thus, the movement of the preventing members is synchronized such that the preventing members may center the part rack therebetween.

The preventing members may be linearly moveable. Thus, the drive and the movement of the preventing members are simplified.

The preventing members may be plates. Thus, the size of the preventing members is reduced.

Alternatively, the preventing members may be pivotally moveable. Thus, the risk for the preventing members to be an obstacle for the movement of other pars of the analyzer is reduced.

The preventing members may be pivotally moveable around a pivoting axis located below a lowermost position of the lift. Thus, the risk for the preventing members to be an obstacle for the movement of other pars of the analyzer is reduced to a minimum.

The lift may comprise a structure configured to center or locate the part racks at a predetermined position on the lift. Such a structure allows the part racks to be correctly stacked without any obstructions.

The automatic analyzer may further comprise a rack positioning device configured to position the part rack during a take out of a disposable part at the part take-out station. Thus, the part rack is centered and the part rack may be reliably oriented at its target position for the take-out of the parts.

The part rack may have positioning recesses formed at a pair of opposite edges thereof, wherein the rack positioning device comprises positioning members configured to engage the positioning recesses. Thus, the part rack may be reliably engaged by the position members.

The rack positioning device may be arranged on the first rack separator. Thus, the space necessary for providing the rack position device is reduced.

The second rack separator may have a pair of hindering members configured to hinder the uppermost part rack from lowering, and the hindering members are configured to operate such that an interval therebetween increases when the uppermost part rack is raised to the rack recovery station and decreases after the uppermost part rack has passed by the position of the pair of hindering members and before the second part rack from the top passes by the position of the pair of hindering members. Thus, the used part rack may be reliably stored above the stack of unused part rack.

The second rack separator may further comprise springs configured to bias the hindering members in a direction towards one another. Thus, a further drive for operating the hindering members may be omitted.

The lift may be configured to provide a force to raise the part rack wherein the force is adjusted such that the part rack opens the hindering members in a direction away from one another against the biasing force of the springs when passing between the hindering members. Thus, the lift operates the hindering members and acts against the biasing force of the springs.

Alternatively, the second rack separator has a pair of hindering members configured to hinder the uppermost part rack from lowering, moveable in a direction perpendicular to a direction in which the lift is moveable. Thus, a construction to similar the first rack separator may be provided.

The automatic analyzer comprises a moving mechanism configured to concertedly move the hindering members. Thus, the movement of the hindering members is synchronized such that the hindering members may center the part rack therebetween.

The hindering members may be linearly moveable. Thus, the drive and the movement of the hindering members is simplified.

The hindering members may be plates. Thus, the size of the preventing members is reduced.

Alternatively, the second rack separator has a two hindering members configured to hinder the uppermost part rack from lowering and a spring configured to bias one of the hindering members in a direction towards one another, wherein the second rack separator further comprises a coupling mechanism configured to couple the hindering members such that a movement of the hindering member biased by the spring causes the other hindering member to concertedly move towards and/or away from the hindering member biased by the spring. Thus, another simplified construction for the operation of the second rack separator is provided.

The automatic analyzer may further comprise a part take-out device configured to take out a disposable part from a part rack, wherein the part take-out device is located at the part take-out station. Thus, a disposable part may be reliably taken-out with a construction of reduced space.

The take-out device is configured to take out the disposable parts from a part rack in a subsequent order. Thus, the disposable parts may be taken-out in a consecutive order. The take-out device may take out the disposable parts from a part rack one by one or more than one at the same time such as two or three disposable parts.

The take-out device is configured to move within a plane perpendicular to a direction in which the lift is moveable. In this case, the drive is simplified as the take-out device does not need to be moved in a three dimensional space but is only moved in a two dimensional manner. Only a gripping element of the take-out device for gripping one or more disposable parts from the part track may be moved out of and into the take-out device perpendicular to this plane. Needless to say, alternatively, the take-out device may be configured to move in all directions within a three dimensional space.

The automatic analyzer may further comprise a frame configured to guide the lift, wherein the frame comprises a lower frame portion configured to support the part take-out station and the second rack separator of the rack recovery station, and an upper frame portion connected to the lower frame portion. Thus, the lift may be well supported in a moveable manner.

The upper frame portion may be removably mounted onto the lower frame portion. Thereby, the upper frame portion may be removed so as to expose the lower frame portion such that the constructional members provided at the lower frame portion are accessible such as for the purpose of service, maintenance, cleaning and adjustment.

The upper frame portion may be pivotally connected to the lower frame portion. Thus, the constructional members provided at the lower frame portion are accessible by means of a simple pivotal movement of the upper frame portion such as for the purpose of service, maintenance, cleaning and adjustment.

The frame may comprise a front end from which part racks are loadable onto the lift and a rear end opposite to the front end, wherein the frame comprises at least one lift guiding rod for guiding the lift arranged at a corner of the lift at the front end or the rear end, wherein the frame comprises an interruption at the rear end at a position defined by the part take-out station. The interruption of the frame is provided on a side opposite to the side where the lift guiding rod is provided. For example, if the lift guiding rod is provided at the left side of the frame if seen from the front end towards the rear end, then the interruption is provided at a right side of the frame at the rear end. Thus, a take-out device for taking out the disposable parts is not obstructed by the frame and the lift guiding rod and has access to each disposable part in the part rack which is located at the interior of the frame. Optionally, an additional interruption may be provided at the front end at a position defined by the part take-out station, wherein the additional interruption of the frame is provided on a side opposite to the side where the lift guiding rod is provided. Alternatively, a combination of a lift guiding rod extending from a position below the part take-out station downwards and at least one linear bearing may be provided.

The first rack separator may be at least partially mounted to the lower frame portion. Thus, the construction of the analyzer is reduced in size.

The frame may comprise a front end from which part racks are loadable onto the lift and a rear end opposite to the front end, wherein the frame is self-supporting at a corner of the lift at the rear end. Thus, the take-out device for taking-out disposable parts from the part rack is not obstructed in its movement.

The frame may comprise two guiding rods at the front end, wherein one of the guiding rods at the front end is shifted in a direction away from the rear end relative to the other guiding rod at the front end. Thus, the take-out device for taking-out disposable parts from the part rack is not obstructed in its movement.

The guiding rods are configured to guide the part racks when moving upwards and downwards. For this purpose, guiding rods may also be provided at the rear end.

The lift may comprise a platform on which the part racks are disposable, wherein the automatic analyzer further comprises a drawer device configured to linearly move the platform in the lowermost position of the lift between an inserted position, in which the platform is located within the frame, and an extracted position, in which the platform is located outside from the frame. Thus, the platform is constructed similar to a drawer and be loaded with unused part racks in the extracted position.

The drawer device may be manually operable. Thus, a drive for moving the drawer device may be omitted.

The automatic analyzer may further comprise at least one closing spring configured to hold the platform in its inserted position and to move the platform to its extracted device. Thus, the movement to the extracted position is simplified while the platform may still be reliably kept in the inserted positon when needed.

Alternatively, the automatic analyzer may further comprise a motor configured to linearly move the platform. Thus, a manual operation of the platform is avoided.

The automatic analyzer may further comprise a first resting device configured to rest the platform in the inserted position. Thus, it is ensured that the platform is in its correct inserted position.

The automatic analyzer may further comprise a position detecting device configured to detect whether the platform is in its inserted position or not. Thus, an incorrect operation of the lift is avoided.

The position detecting device may comprise a light barrier configured to detect a portion of the platform. Thus, it may be reliably be detected whether the platform is in its correct position or not.

The position detecting device may be mounted to the lift or to the frame. Thus, the space required for providing the position detecting device is reduced.

The automatic analyzer may further comprise a second resting device configured to rest the platform in the extracted position. Thus, it is ensured that the platform is accessible and may be loaded with unused part racks.

The automatic analyzer may further comprise a scanner configured to detect an identity of a part rack. Thus, it is ensured that only correct or original part racks are handled by the analyzer.

The scanner may be located at a position defined by the position of the uppermost part rack of a plurality of part racks stacked to their maximum with the lift in its lowermost position or a position shifted relative from the uppermost part rack towards the rack recovery station. Thus, the scanner may detect the identity of each of the stacked part racks.

The scanner may be a single scanner configured to detect the identity of the part rack. Thus, a single scanner is required for detecting the identity of each of the stacked part racks.

The scanner may be stationary. Thus, a drive for moving the scanner is omitted.

The scanner may be configured to detect the identity of each part rack of a plurality of part racks stacked onto the lift by moving the plurality of part racks stacked onto the lift to a detecting position of the scanner. Thus, the scanner is stationary, the part racks are moved relative to the scanner wherein each part racks is moved to a detecting position of the scanner where the identity of the part racks can be detected by means of the scanner. For example, the part racks are raised in a subsequent order to a position in front of the scanner.

The lift may be configured to move the plurality of part racks stacked onto the lift upwards and subsequently downwards so as to pass the scanner. Thus, the detection operation is coupled to the movement of the lift and, therefore, a separate movement for detecting the identity of the part racks may be avoided.

The plurality of part racks comprises 3 to 10 and typically 4 to 7 part racks. Thus, a sufficient number of part racks may be handled with the analyzer.

The scanner is configured to verify authenticity of a part rack. Thereby, the insertion of a fraud part rack into the operation of the analyzer which might cause a malfunction is avoided.

The scanner may be a RFID reader configured to detect the identity of the part rack by means of a RFID tag attached to the part rack. Thus, the identity may be reliably be detected with well established means.

The scanner may be a barcode reader configured to detect the identity of the part rack by means of a barcode located at the part rack. Thus, the identity may be reliably be detected with well established means.

The barcode may be integrated with the part rack. Thus, a manipulation of the barcode may be avoided.

The barcode may be disposed in an outer surface of the part rack by means of a laser. Thus, a manipulation of the barcode may be reliably avoided.

The barcode may be a one-dimensional or two-dimensional barcode. Thus, the range for usable barcodes is increased.

The scanner may be configured to detect a marker integrated into the material of a part rack.

Thus, a genuine part rack may be reliably detected.

The scanner is configured to optically detect the marker. Thus, a genuine part rack may be reliably detected with a rather simple means.

The lift may be configured to raise the stacked part racks to the rack recovery station. For example, the lift may raise the stacked part racks to the rack recovery station after all or at least some of the disposable parts of a part rack have been taken-out in the part take-out station. Needless to say, the lift may raise the stacked part racks to the rack recovery station even if some of the disposable parts remain in the part rack. Thus, the used part rack may be transported to its storage or disposal position.

Summarizing the findings of the disclosed analyzer, the following embodiments are disclosed:

Embodiment 1

An automatic analyzer for analyzing samples using disposable parts, comprising a lift, a part take-out station and a rack recovery station, wherein the rack recovery station is arranged above the part take-out station, wherein the lift is configured to raise and lower a plurality of stacked part racks to the part take-out station while keeping the part racks together and to the rack recovery station while keeping the part racks together, wherein the part take-out station comprises a first rack separator configured to prevent the uppermost one of said stacked part racks from being lowered when said lift lowers, while allowing the other part racks to lower, so that the uppermost rack is separated from the other part racks so as to remain in the part take-out station, wherein the rack recovery station comprises a second rack separator configured to prevent the uppermost one of said stacked part racks from being lowered when said lift lowers, while allowing the other part racks to lower, so that the uppermost rack is separated from the other part racks so as to remain in the rack recovery station.

Embodiment 2

The automatic analyzer according to embodiment 1, wherein the first rack separator comprises a pair of opposing preventing members configured to prevent the uppermost one of said stacked part racks from being lowered when said lift lowers.

Embodiment 3

The automatic analyzer according to embodiment 2, wherein the preventing members are moveable in a direction perpendicular to a direction in which the lift is moveable.

Embodiment 4

The automatic analyzer according to embodiment 2 or 3, wherein the part racks comprise at least two opposing side walls, wherein the preventing members are configured to engage a lower rim of the two opposing side walls.

Embodiment 5

The automatic analyzer according to embodiment 4, wherein the lower rim of the at least two opposing side walls comprises protrusions, wherein the preventing members are configured to engage the protrusions.

Embodiment 6

The automatic analyzer according to any one of embodiments 2 to 5, further comprising a drive mechanism configured to concertedly move the preventing members.

Embodiment 7

The automatic analyzer according to any one of embodiments 2 to 6, wherein the preventing members are linearly moveable.

Embodiment 8

The automatic analyzer according to any one of embodiments 2 to 7, wherein the preventing members are plates.

Embodiment 9

The automatic analyzer according to any one of embodiments 2 to 6, wherein the preventing members are pivotally moveable.

Embodiment 10

The automatic analyzer according to embodiment 9, wherein the preventing members are pivotally moveable around a pivoting axis located below a lowermost position of the lift.

Embodiment 11

The automatic analyzer according to any one of embodiments 1 to 10, further comprising a rack positioning device configured to position the part rack during a take out of a disposable part at the part take-out station.

Embodiment 12

The automatic analyzer according to embodiment 11, wherein the part rack has positioning recesses formed at a pair of opposite edges thereof, wherein the rack positioning device comprises positioning members configured to engage the positioning recesses.

Embodiment 13

The automatic analyzer according to embodiment 11 or 12, wherein the rack positioning device is arranged on the first rack separator.

Embodiment 14

The automatic analyzer according to any one of embodiments 1 to 13, wherein the second rack separator has a pair of hindering members configured to hinder the uppermost part rack from lowering, and the hindering members are configured to operate such that an interval therebetween increases when the uppermost part rack is raised to the rack recovery station and decreases after the uppermost part rack has passed by the position of the pair of hindering members and before the second part rack from the top passes by the position of the pair of hindering members.

Embodiment 15

The automatic analyzer according to embodiment 14, wherein the second rack separator further comprises springs configured to bias the hindering members in a direction towards one another.

Embodiment 16

The automatic analyzer according to embodiment 15, wherein the lift is configured to provide a force to raise the part rack wherein the force is adjusted such that the part rack opens the hindering members in a direction away from one another against the biasing force of the springs when passing between the hindering members.

Embodiment 17

The automatic analyzer according to any one of embodiments 1 to 13, wherein the second rack separator has a pair of hindering members configured to hinder the uppermost part rack from lowering, moveable in a direction perpendicular to a direction in which the lift is moveable Embodiment 18

The automatic analyzer according to embodiment 17, wherein the automatic analyzer comprises a moving mechanism configured to concertedly move the hindering members.

Embodiment 19

The automatic analyzer according to embodiment 17 or 18, wherein the hindering members are linearly moveable.

Embodiment 20

The automatic analyzer according to any one of embodiments 17 to 19, wherein the hindering members are plates.

Embodiment 21

The automatic analyzer according to any one of embodiments 1 to 13, wherein the second rack separator has a two hindering members configured to hinder the uppermost part rack from lowering and a spring configured to bias one of the hindering members in a direction towards one another, wherein the second rack separator further comprises a coupling mechanism configured to couple the hindering members such that a movement of the hindering member biased by the spring causes the other hindering member to concertedly move towards and/or away from the hindering member biased by the spring.

Embodiment 22

The automatic analyzer according to any one of embodiments 1 to 21, further comprising a part take-out device configured to take out a disposable part from a part rack, wherein the part take-out device is located at the part take-out station.

Embodiment 23

The automatic analyzer according to embodiment 22, wherein the take-out device is configured to take out the disposable parts from a part rack in a subsequent order.

Embodiment 24

The automatic analyzer according to embodiment 22 or 23, wherein the takeout device is configured to move within a plane perpendicular to a direction in which the lift is moveable.

Embodiment 25

The automatic analyzer according to any one of embodiments 1 to 24, further comprising a frame configured to guide the lift, wherein the frame comprises a lower frame portion configured to support the part take-out station and the second rack separator of the rack recovery station, and an upper frame portion connected to the lower frame portion.

Embodiment 26

The automatic analyzer according to embodiment 25, wherein the upper frame portion is removably mounted onto the lower frame portion.

Embodiment 27

The automatic analyzer according to embodiment 25, wherein the upper frame portion is pivotally connected to the lower frame portion.

Embodiment 28

The automatic analyzer according to any one of embodiments 25 to 27, wherein the frame comprises a front end from which part racks are loadable onto the lift and a rear end opposite to the front end, wherein the frame comprises at least one lift guiding rod for guiding the lift arranged at a corner of the lift at the front end or rear end, wherein the frame comprises an interruption at the rear end at a position defined by the part take-out station at a side opposite to the lift guiding rod.

Embodiment 29

The automatic analyzer according to embodiment 27, wherein the first rack separator is at least partially mounted to the lower frame portion.

Embodiment 30

The automatic analyzer according to any one of embodiments 25 to 29, wherein the frame comprises a front end from which part racks are loadable onto the lift and a rear end opposite to the front end, wherein the frame is self-supporting at a corner of the lift at the rear end.

Embodiment 31

The automatic analyzer according to any one of embodiments 25 to 30, wherein the frame comprises two guiding rods at the front end, wherein one of the guiding rods at the front end is shifted in a direction away from the rear end relative to the other guiding rod at the front end.

Embodiment 32

The automatic analyzer according to any one of embodiments 25 to 31, wherein the lift comprises a platform on which the part racks are disposable, wherein the automatic analyzer further comprises a drawer device configured to linearly move the platform in the lowermost position of the lift between an inserted position, in which the platform is located within the frame, and an extracted position, in which the platform is located outside from the frame.

Embodiment 33

The automatic analyzer according to embodiment 32, wherein the drawer device is manually operable.

Embodiment 34

The automatic analyzer according to embodiment 32 or 33, further comprising at least one closing spring configured to hold platform in its inserted position and to move the platform to its extracted device.

Embodiment 35

The automatic analyzer according to embodiment 32, further comprising a motor configured to linearly move the platform.

Embodiment 36

The automatic analyzer according to any one of embodiments 32 to 35, further comprising a first resting device configured to rest the platform in the inserted position.

Embodiment 37

The automatic analyzer according to any one of embodiments 32 to 36, further comprising a position detecting device configured to detect whether the platform is in its inserted position or not.

Embodiment 38

The automatic analyzer according to embodiment 37, wherein the position detecting device comprises a light barrier configured to detect a portion of the platform.

Embodiment 39

The automatic analyzer according to embodiment 37 or 38, wherein the position detecting device is mounted to the lift or to the frame.

Embodiment 40

The automatic analyzer according to any one of embodiments 32 to 39, further comprising a second resting device configured to rest the platform in the extracted position.

Embodiment 41

The automatic analyzer according to any one of embodiments 1 to 40, further comprising a scanner configured to detect an identity of a part rack.

Embodiment 42

The automatic analyzer according to embodiment 41, wherein the scanner is located at a position defined by a position of the uppermost part rack of a plurality of part racks stacked to their maximum with the lift in its lowermost position or a position shifted from the uppermost part rack towards the rack recovery station.

Embodiment 43

The automatic analyzer according to embodiment 41 or 42, wherein the scanner is a single scanner configured to detect the identity of the part rack

Embodiment 44

The automatic analyzer according to any one of embodiments 41 to 43, wherein the scanner is stationary.

Embodiment 45

The automatic analyzer according to any one of embodiments 41 to 44, wherein the scanner is configured to detect the identity of each part rack of a plurality of part racks stacked onto the lift by moving the plurality of part racks stacked onto the lift so as to a detecting position of the scanner.

Embodiment 46

The automatic analyzer according to embodiment 45, wherein the lift is configured to move the plurality of part racks stacked onto the lift upwards and subsequently downwards so as to pass the scanner.

Embodiment 47

The automatic analyzer according to embodiment 45 or 46, wherein the plurality of part racks comprises 3 to 10 and typically 4 to 7 part racks.

Embodiment 48

The automatic analyzer according to any one of embodiments 41 to 47, wherein the scanner is configured to verify authenticity of a part rack.

Embodiment 49

The automatic analyzer according to any one of embodiments 41 to 48, wherein the scanner is a RFID reader configured to detect the identity of the part rack by means of a RFID tag attached to the part rack.

Embodiment 50

The automatic analyzer according to any one of embodiments 41 to 48, wherein the scanner is a barcode reader configured to detect the identity of the part rack by means of a barcode located at the part rack.

Embodiment 51

The automatic analyzer according to embodiment 50, wherein the barcode is integrated with the part rack.

Embodiment 52

The automatic analyzer according to embodiment 50 or 51, wherein the barcode is disposed in an outer surface of the part rack by means of a laser.

Embodiment 53

The automatic analyzer according to any one of embodiments 50 to 41, wherein the barcode is a one-dimensional or two-dimensional barcode.

Embodiment 54

The automatic analyzer according to embodiment 41, wherein the scanner is configured to detect a marker integrated into the material of a part rack.

Embodiment 55

The automatic analyzer according to embodiment 54, wherein the scanner is configured to optically detect the marker.

Embodiment 56

The automatic analyzer according to any one of embodiments 1 to 55, wherein the lift is configured to raise the stacked part racks to the rack recovery station after the disposable parts of a part rack have been taken-out in the part take-out station.

In order that the embodiments of the present disclosure may be more readily understood, reference is made to the following examples, which are intended to illustrate the disclosure, but not limit the scope thereof.

FIG. 1 shows a perspective view of an automatic analyzer 100 for analyzing samples using disposable parts such as nozzle tips or reagent vessels. The automatic analyzer comprises a lift 102 configured to be loaded with a plurality of part racks 104. The plurality of part racks comprises 3 to 10 and typically 4 to 7 part racks such as five part racks 104. The lift 102 comprises a platform 106 on which the part racks 104 are disposable. The automatic analyzer 100 further comprises a part take-out station 108 and a rack recovery station 110. The rack recovery station 110 is arranged above the part take-out station 108 with respect to a direction of gravity. As will be explained in further detail, the lift 102 is configured to raise and lower a plurality of stacked part racks 104 to the part take-out station 108 while keeping the part racks 104 together and to the rack recovery station 110 while keeping the part racks 104 together. The rack recovery station 110 may comprise guiding means for guiding the part racks 104 stored therein such as by means of angled members engaging the lower rim 132.

The part take-out station 108 comprises a first rack separator 112 configured to prevent the uppermost one of said stacked part racks 104 from being lowered when said lift 102 lowers, while allowing the other part racks 104 to lower, so that the uppermost part rack 104 is separated from the other part racks 104 so as to remain in the part take-out station 108.

Figure 2:
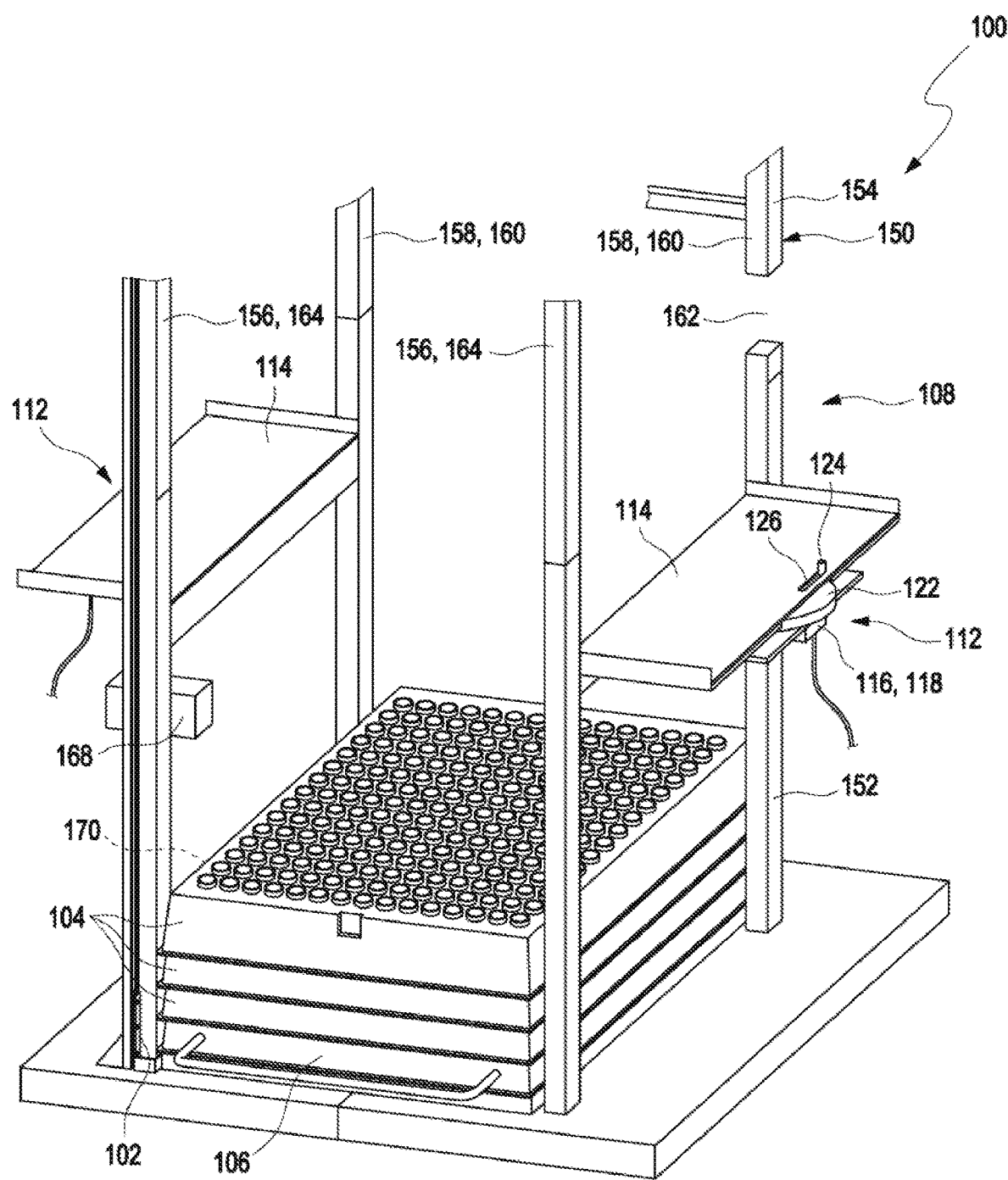
FIG. 2 shows a perspective view of the automatic analyzer with the lift in a lowermost position.
Figure 3:
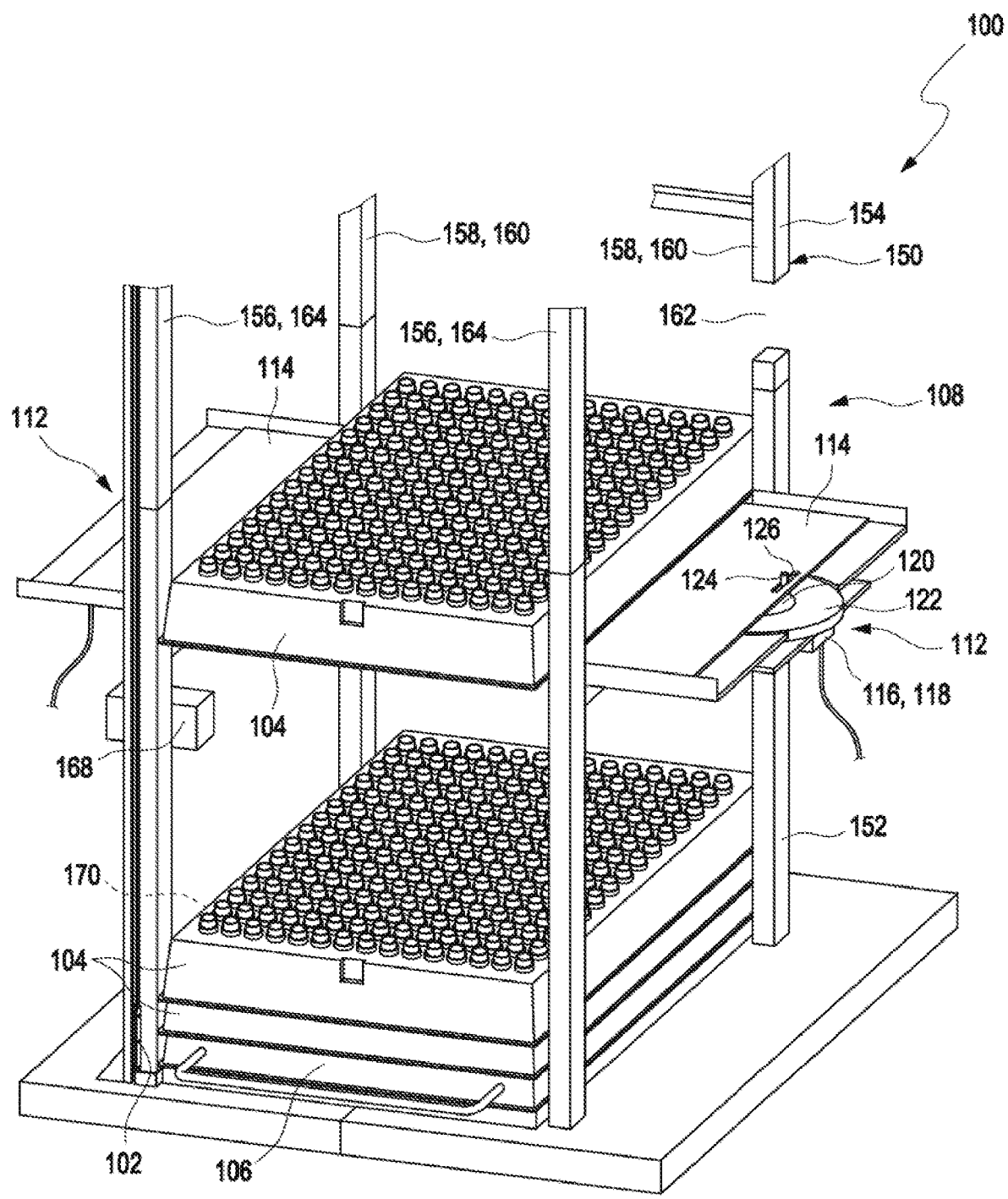
FIG. 3 shows a perspective view of the automatic analyzer with the lift in a raised position.

FIG. 2 shows a perspective view of the automatic analyzer 100 with the lift 102 in a lowermost position. FIG. 3 shows a perspective view of the automatic analyzer 100 with the lift 102 in a raised position. The first rack separator 112 comprises a pair of opposing preventing members 114 configured to prevent the uppermost one of said stacked part racks 104 from being lowered when said lift 102 lowers. The preventing members 114 are plates in the present embodiment.

The preventing members 114 are moveable in a direction perpendicular to a direction in which the lift 102 is moveable. Particularly, the preventing members 114 are linearly moveable. The preventing members 114 may be moved by means of a drive mechanism 116. For example, the drive mechanism 116 comprises a motor 118 having a rotatable driving shaft 120 and a disc 122 mounted to the driving shaft 120. A pin 124 is eccentrically located on the disc 122. The pin 124 engages a slot 126 of a preventing member 114. Thus, when the disc 122 is rotated, the pin 124 moves within the slot 126 and, thereby, moves the preventing member 114 towards each other or away from one another. FIG. 2 shows the preventing members 114 moved in a position away from one another and FIG. 3 shows the preventing members 114 moved in a position towards one another. Thus, a drive mechanism 116 may be associated with respective one of the preventing members 114. The drive mechanism 116 may be configured to concertedly move the preventing members 114. For example, the preventing members 114 may be connected to on another by means of a linkage assembly. Thus, alternatively, a single drive or motor is sufficient for moving both preventing members 114 at the same time. The movement of the preventing members 114 is controlled by means of a sensor (not shown in detail).

Figure 4:
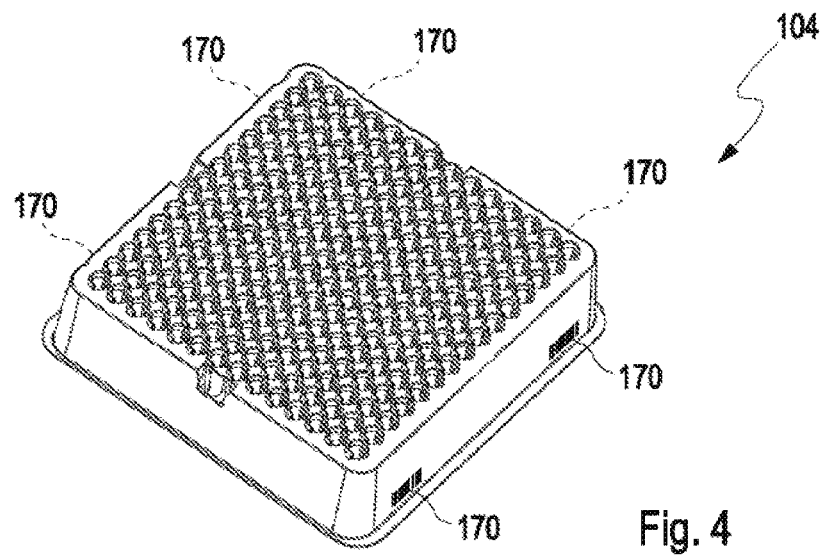
FIG. 4 shows a perspective view of a part rack.
Figure 5:
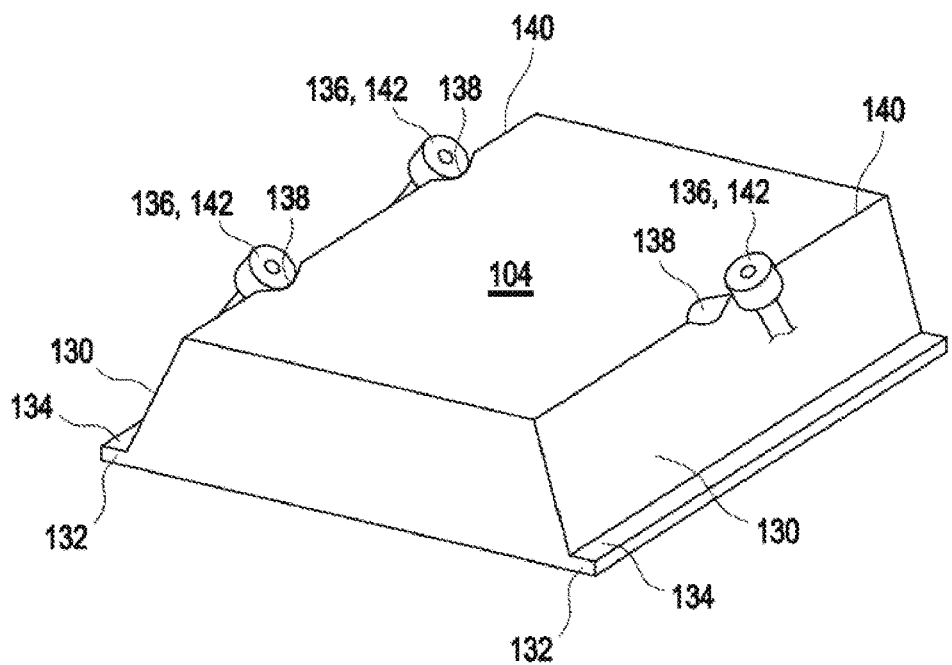
FIG. 5 shows a simplified perspective view of the part rack.
Figure 6:
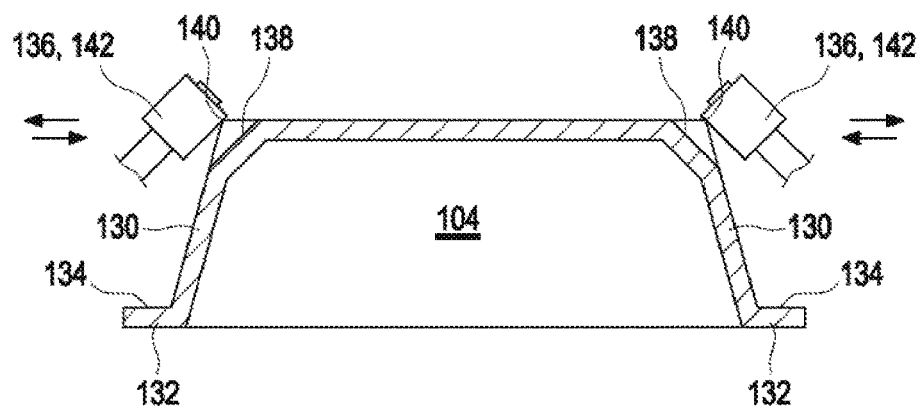
FIG. 6 shows a cross-sectional view of the part rack shown in FIG. 5.

FIG. 4 shows a perspective view of a part rack 104. The part rack 104 comprises a plurality of compartments each configured to receive a disposable part. FIG. 5 shows a simplified perspective view of the part rack 104. FIG. 6 shows a cross-sectional view of the part rack shown in FIG. 5. As shown in FIG. 5, the part racks 104 comprise at least two opposing side walls 130. The preventing members 114 are configured to engage a lower rim 132 of the two opposing side walls 130 as shown in FIG. 3. More particularly, the lower rim 132 of the at least two opposing side walls 130 comprises protrusions 134 and the preventing members 114 are configured to engage the protrusions 134 as shown in FIG. 3.

The automatic analyzer 100 further comprises a rack positioning device 136 configured to position the part rack 104 during a take out of a disposable part at the part take-out station 108. The rack positioning device 136 is arranged on the first rack separator 112. As shown in FIG. 6, the part rack 104 has positioning recesses 138 formed at a pair of opposite edges 140 thereof. For example, the part rack 104 comprises two recesses 138 on one of the edges 140 and one recess 138 at the opposite edge 140. The rack positioning device 136 comprises positioning members 142 configured to engage the positioning recesses 138 as shown in FIG. 6. For example, the positioning members 142 are bearings that may abut against the part rack 104 and engage the recesses 138. The positioning members 142 may be disposed on or connected to the preventing members 114 so as to be moved when the preventing members 114 are moved. Thereby, the preventing members 114 may be moved into three positions, i.e., an open position allowing the part racks 104 to pass therethrough, a separating position allowing to separate the uppermost part rack 104 to be separated from a stack of part racks 104 and a centering position allowing to center a part rack 104 by means of the positioning members 142.

Figure 7:
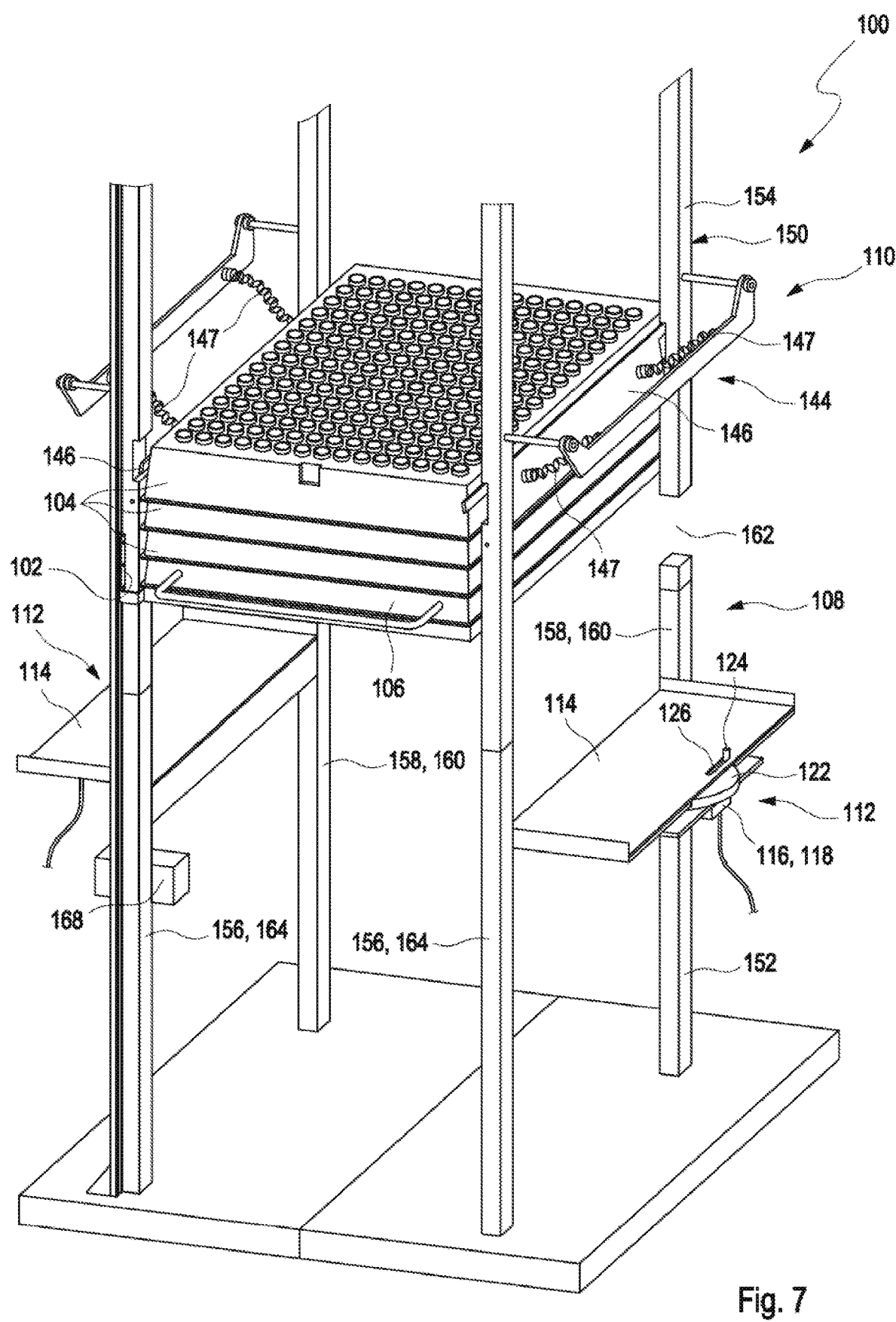
FIG. 7 shows a perspective view of the automatic analyzer with the lift raised in the rack recovery station.
Figure 8:
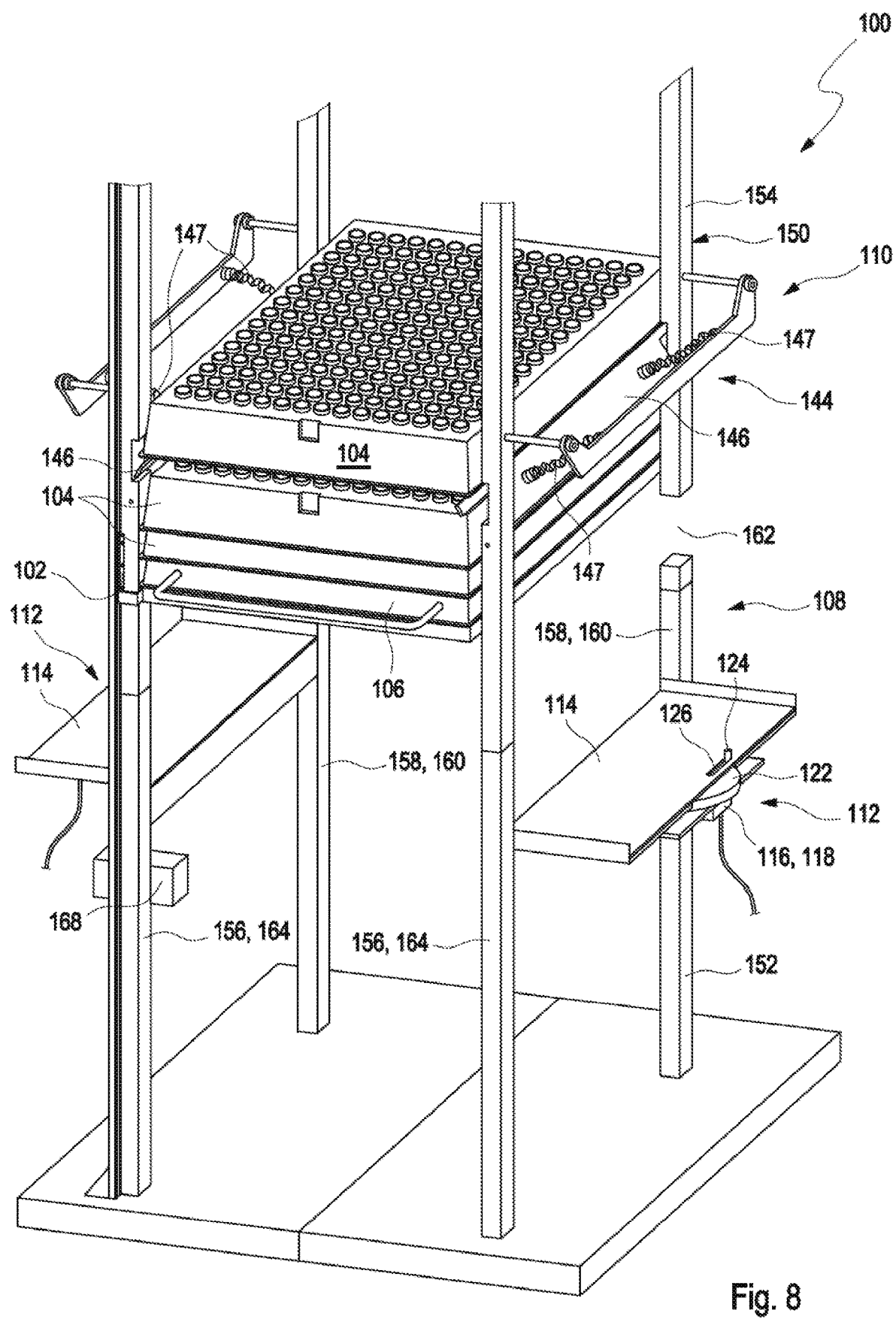
FIG. 8 shows another perspective view of the automatic analyzer with the lift raised in the rack recovery station.
Figure 9:
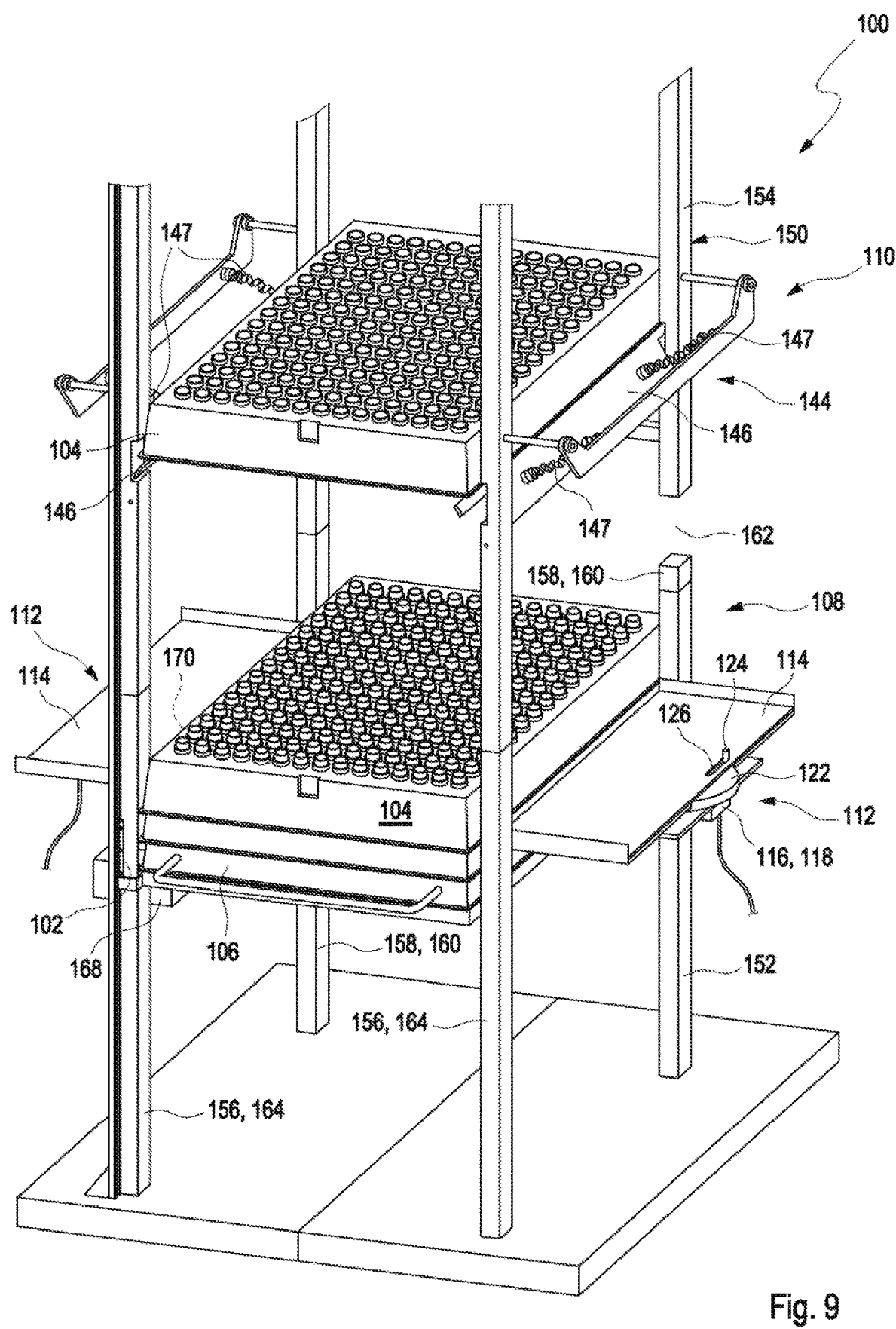
FIG. 9 shows another perspective view of the automatic analyzer with the lift lowered from the rack recovery station.
Figure 10:
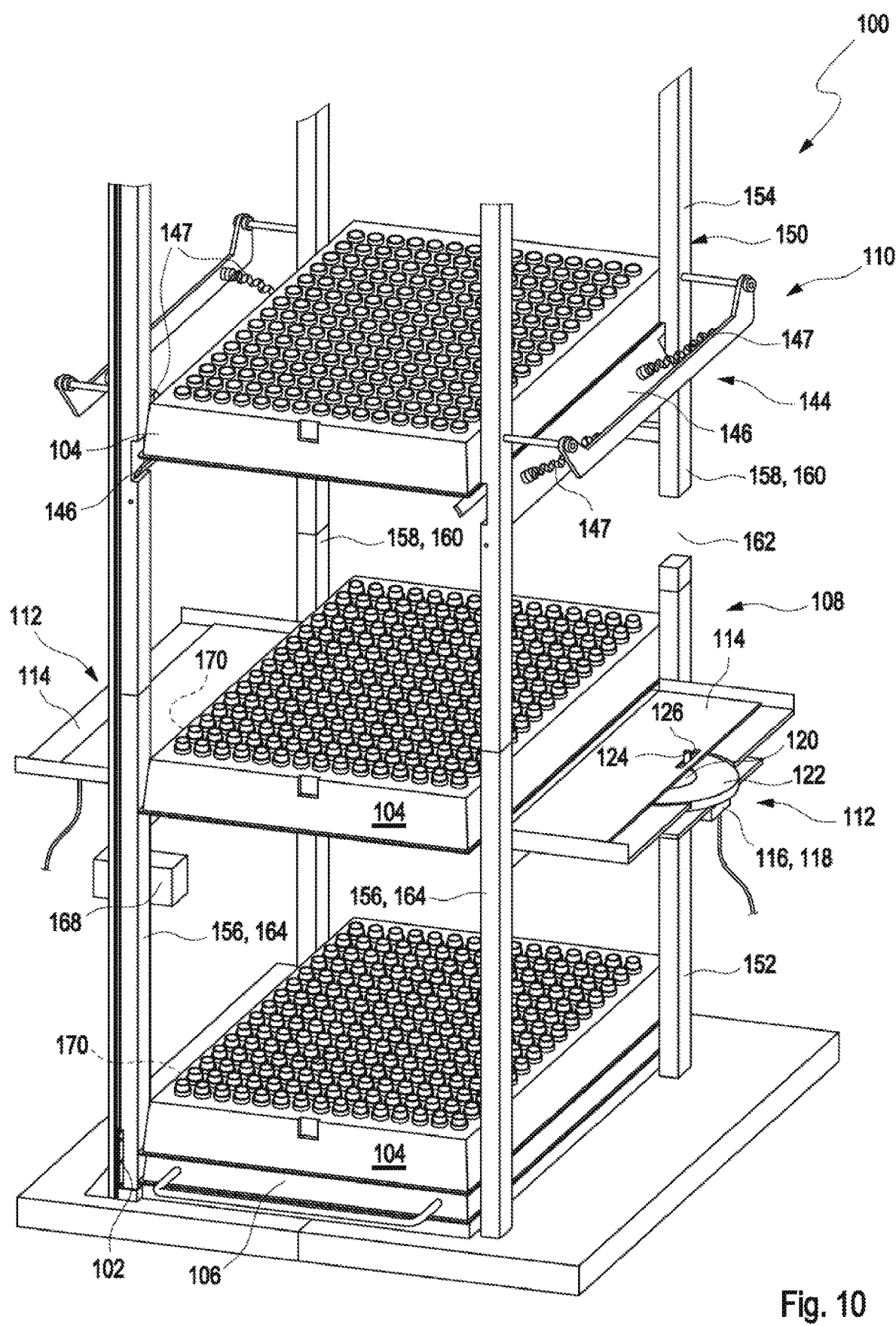
FIG. 10 shows another perspective view of the automatic analyzer with the lift lowered from the part take-out station.

FIG. 7 shows a perspective view of the automatic analyzer 100 with the lift 102 raised in the rack recovery station 110. FIG. 8 shows another perspective view of the automatic analyzer 100 with the lift 102 raised in the rack recovery station 110. FIG. 9 shows another perspective view of the automatic analyzer 100 with the lift 102 lowered from the rack recovery station 110. FIG. 10 shows another perspective view of the automatic analyzer 100 with the lift 102 lowered from the part take-out station 108. The rack recovery station 110 comprises a second rack separator 144 configured to prevent the uppermost one of said stacked part racks 104 from being lowered when said lift 102 lowers, while allowing the other part racks 104 to lower, so that the uppermost rack 104 is separated from the other part racks 104 so as to remain in the rack recovery station 110. The second rack separator 144 has a pair of hindering members 146 configured to hinder the uppermost part rack 104 from lowering. The hindering members 146 are configured to operate such that an interval therebetween increases when the uppermost part rack 104 is raised to the rack recovery station 110 as shown in FIG. 7 and decreases after the uppermost part rack has passed by the position of the pair of hindering members 146 and before the second part rack 104 from the top passes by the position of the pair of hindering members 146 as shown in FIGS. 8 and 9. Thus, the hindering members 146 are moveable into two positions, i.e., an open positon allowing a part rack 104 to pass therethrough and a separating position allowing to separate the uppermost part rack 104 from a stack of part racks 104. For this purpose, the second rack separator 144 further comprises springs 147 configured to bias the hindering members 146 in a direction towards one another. The lift 102 is configured to provide a force to raise the part rack 104 wherein the force is adjusted such that the part rack 104 opens the hindering members 146 in a direction away from one another against the biasing force of the springs 147 when passing between the hindering members 146 as shown in FIG. 7. FIG. 8 shows the uppermost part rack 104 separated from the stack of part racks 104 and FIG. 9 shows the uppermost part rack 104 separated from the stack of part racks 104 and the lift 102 lowered from the rack recovery station 110 with the remaining part racks 104 stacked thereon. FIG. 10 shows the uppermost part rack 104 separated from the stack of part racks 104, the second part rack 104 from the top separated by the first rack separator 112 and the lift 102 lowered to its lowermost position with the remaining part racks 104 stacked thereon. Alternatively, the hindering members 146 are designed similar to the preventing members 114 of the first rack separator 112. For example, the hindering members 146 may be plates that are linearly moveable in a direction perpendicular to a direction in which the lift 102 is moveable. Further, the automatic analyzer 100 may comprise a moving mechanism configured to concertedly move the hindering members 146. As a further alternative, the second rack separator 144 has a two hindering members configured to hinder the uppermost part rack 104 from lowering and a spring configured to bias one of the hindering members in a direction towards one another. With this example, the second rack separator 144 further comprises a coupling mechanism configured to couple the hindering members such that a movement of the hindering member biased by the spring causes the other hindering member to concertedly move towards and/or away from the hindering member biased by the spring.

The automatic analyzer 100 further comprises a part take-out device 148 configured to take out a disposable part from a part rack 104. The part take-out device 148 is located at the part take-out station 108. The take-out device 148 is configured to take out the disposable parts from a part rack 104 in a subsequent order. The lift 102 is configured to raise the stacked part racks 104 to the rack recovery station 110 after all or at least some of the disposable parts of a part rack 104 have been taken-out in the part take-out station 110. The take-out device 148 is configured to move within a plane perpendicular to a direction in which the lift 102 is moveable. For example, the take-out device 148 may be designed as a movable gripper head or a holding part as described in EP 1 275 966 A1, the design of which is incorporated by reference herein.

As shown in FIG. 2, the automatic analyzer 100 further comprising a frame 150 configured to guide the lift 102. The frame 150 comprises a lower frame portion 152 configured to support the part take-out station 108 and the second rack separator 144 of the rack recovery station 110, and an upper frame portion 154 connected to the lower frame 152. Optionally, the upper frame portion 154 is removably mounted onto the lower frame portion 152. Alternatively, the upper frame portion 154 may be pivotally connected to the lower frame portion 152. The frame 150 comprises a front end 156 from which part racks 104 are loadable onto the lift 102 and a rear end 158 opposite to the front end 156. The frame 150 comprises at least one lift guiding rod 160 for guiding the lift 102 arranged at a corner of the lift 102 at the front end 156 of the frame 150. In the embodiment shown in FIG. 2, the lift guiding rod 160 is arranged at the left side of the frame 150 at the front end 156. Thus, the lift is guided only at one position which decreases the space necessary for moving the lift 102. The frame 150 comprises an interruption 162 at the rear end 158 at a position defined by the part take-out station 108. In the embodiment shown in FIG. 2, the interruption 162 is arranged at the right side of the frame 150 at the rear end 158. The first rack separator 112 is at least partially mounted to the lower frame portion 152. Alternatively, the frame 150 is self-supporting at a corner of the lift 102 at the rear end 158. The frame 150 comprises two guiding rods 164 at the front end 156 for guiding the part racks 104. One of the guiding rods 164 at the front end 156 may be shifted in a direction away from the rear end 158 relative to the other guiding rod 164 at the front end 156. One of the guiding rods 164 may be identical to the lift guiding rod 160. Needless to say, the frame 150 may comprise one or two guiding rods 164 at the rear end 158.

Figure 11:
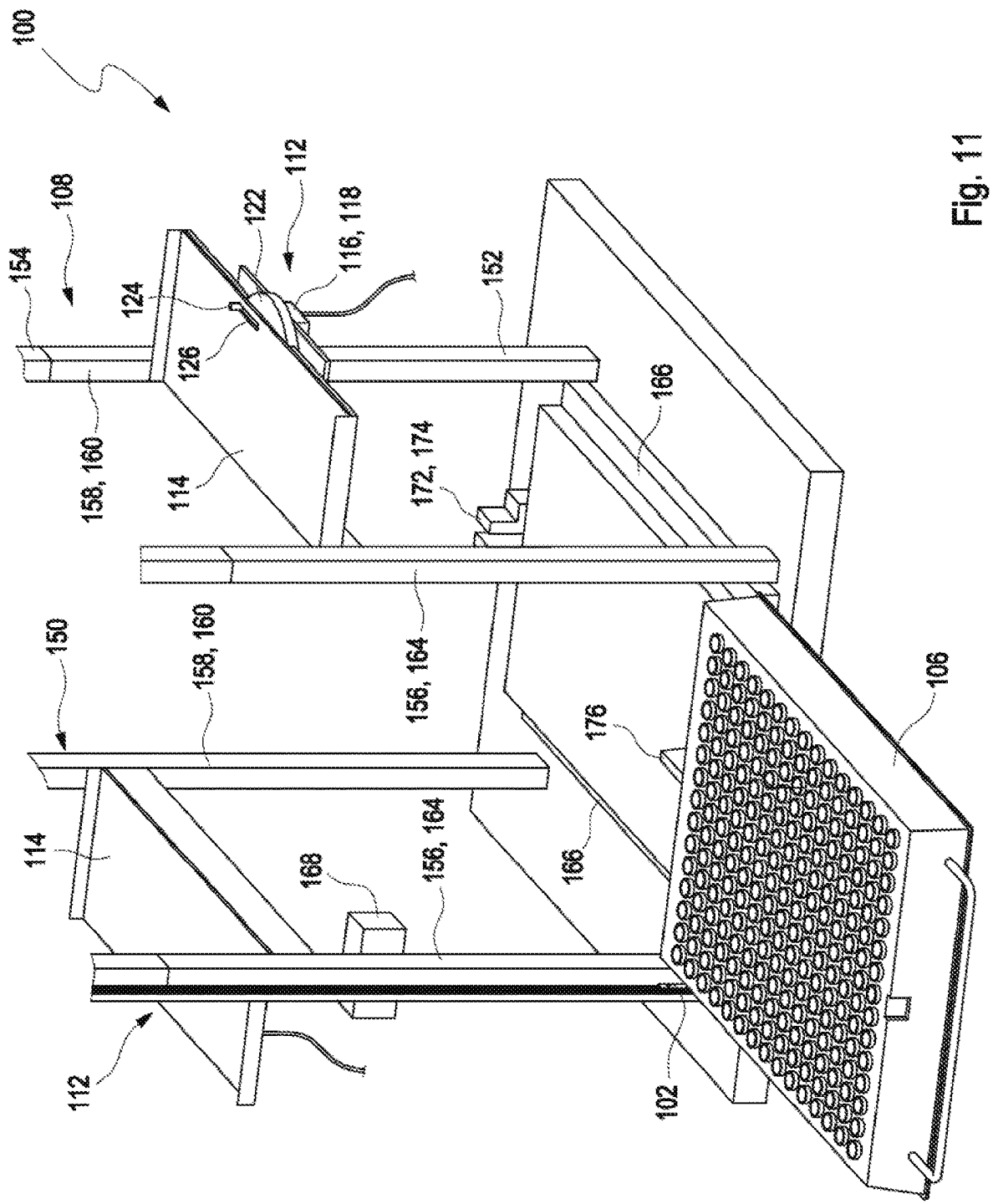
FIG. 11 shows a perspective view of the automatic analyzer with the platform in an extracted position.
Figure 12:
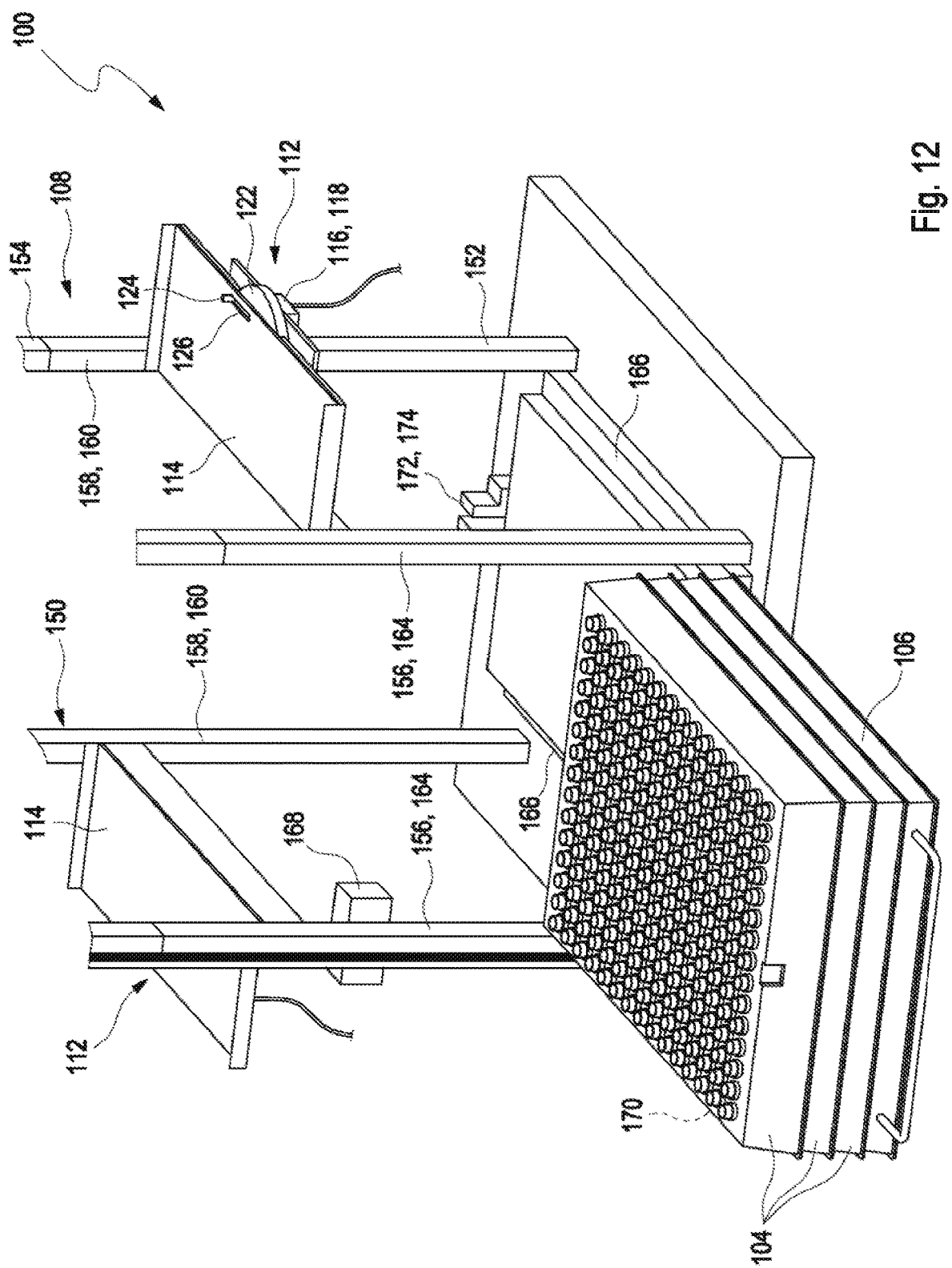
FIG. 12 shows a perspective view of the automatic analyzer with the platform in an extracted position.
Figure 13:
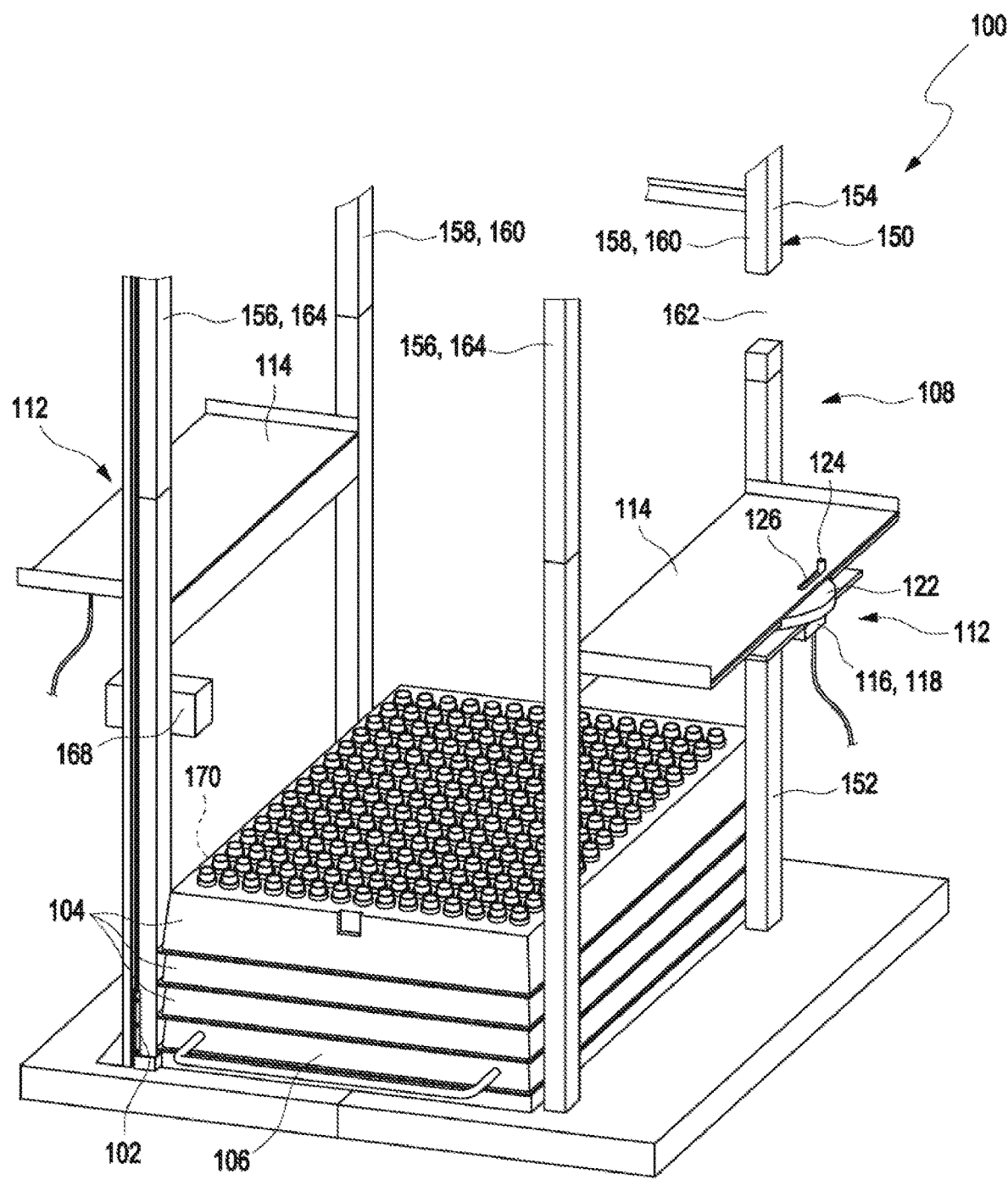
FIG. 13 shows a perspective view of the automatic analyzer with the platform in an inserted position and a stack of part racks disposed on the platform.

FIG. 11 shows a perspective view of the automatic analyzer 100 with the platform in an extracted position. FIG. 12 shows a perspective view of the automatic analyzer 100 with the platform in an extracted position and a stack of part racks 104 disposed on the platform 106. FIG. 13 shows a perspective view of the automatic analyzer 100 with the platform in an inserted position and a stack of part racks 104 disposed on the platform 106. The automatic analyzer 100 further comprises a drawer device 166 configured to linearly move the platform 106 in the lowermost position of the lift 102 between an inserted position, in which the platform 106 is located within the frame 150, and an extracted position, in which the platform 106 is located outside from the frame 150. For example, the drawer device 166 may comprise telescoping arms or the like connected to the platform 106. Thus, unused part racks 104 may be loaded on the platform 106 when the lift is in the lowermost position and the platform 106 is in the extracted position. The drawer device 166 is manually operable. For example, a handle may be provided at the platform for pulling out the platform 106. Alternatively, the automatic analyzer 100 may further comprise a motor configured to linearly move the platform 106. The automatic analyzer 100 further comprises at least one closing spring (not shown in detail) configured to hold platform 106 in its inserted position and to move the platform 106 to its extracted position. Thus, by means of pushing or pressing the platform 106, the platform 106 may be secured in its inserted position or is moved outwards in its extracted position by means of the restoring force of the closing spring. The automatic analyzer 100 may further comprise a first resting device (not shown in detail) configured to rest the platform 106 in the inserted position. The automatic analyzer may further comprise a second resting device (not shown in detail) configured to rest the platform 106 in the extracted position.

The automatic analyzer 100 further comprises a scanner 168 configured to detect an identity of a part rack 104. The scanner 168 is located at a position defined by the position of the uppermost part rack 104 of a plurality of part racks 104 stacked to their maximum with the lift 102 in its lowermost position or a position shifted from the uppermost part rack 104 towards the rack recovery station 110. With other words, the position of the scanner 168 is defined by the top one of the complete stack of part racks 104 when the lift 102 is in its lowermost position. The scanner 168 is a single scanner configured to detect the identity of the part rack 104. With other words, a single scanner is sufficient for detecting the identity of all part racks 104 provided as a stack on the lift 102. The scanner 168 is stationary. For example, the scanner 168 is fixed to the frame 150. The scanner 168 is configured to detect the identity of each part rack 104 of a plurality of part racks 104 stacked onto the lift 102 by moving the plurality of part racks 104 stacked onto the lift 104 so as to pass the scanner 168. The lift 102 is configured to move the plurality of part racks 104 stacked onto the lift 102 subsequently upwards and/or subsequently downwards so as to pass the scanner 168.

Alternatively or in addition, the scanner 168 may be configured to verify authenticity of a part rack 104. For example, the scanner 168 is a barcode reader configured to detect the identity of the part rack 104 by means of a barcode 170 located at the part rack 104. The barcode 170 is integrated with the part rack 104. The barcode 170 may be disposed in an outer surface of the part rack 104 by means of a laser. The barcode 170 is disposed adjacent the lower rim 132 of a part rack 104. This position for the barcode 170 allows the same to be detected by means of the scanner 168 even if a further part rack 104 is stacked onto another part rack 104 as the barcode 170 is not covered by the upper part rack 104. The barcode 170 may be disposed on outer side surfaces and/or an outer rear surface of the part rack 104 as shown in FIG. 4 which shows possible positions for the barcode 170 on the part rack 104. Basically, the barcode 170 may be a one-dimensional or two-dimensional barcode. Alternatively, the scanner 168 may be a RFID reader configured to detect the identity of the part rack by means of a RFID tag attached to the part rack 104. Alternatively, the scanner 168 is configured to detect a marker integrated into the material of a part rack 104. For example, the scanner 168 is configured to optically detect the marker.

As shown in FIG. 11, the automatic analyzer 100 may further comprise a position detecting device 172 configured to detect whether the platform 106 is in its inserted position or not. The position detecting device 172 comprises a light barrier 174 configured to detect a portion of the platform 106 such as a protrusion, marker or flag 176 disposed at a rear end of the platform 106. The position detecting device 172 is mounted to the lift or to the frame.

Hereinafter, an example for the operation for automatic analyzer 100 is described in further detail. In the initial state, the lift 102 is in its lowermost position and the platform 106 is moved to the extracted position by means of the drawer device 166 as shown in FIG. 11. Then, a stack of unused part racks 104 is loaded onto the platform 106 which is still in the extracted position as shown in FIG. 12. Subsequently, the platform 106 carrying the stack of unused part racks 104 is moved to the inserted position by means of the drawer device 166 as shown in FIG. 13. The position detecting device 172 detects the platform 106 being in its inserted position as the flag 176 at the rear end of the platform 106 enters the light barrier 174. Basically, the light barrier 174 may be used to prevent a movement of the lift 102 when the lift 102 is in its lowermost position and the platform 106 is in the extracted position, and to allow a movement of the lift 102 when the platform 106 is in the inserted position. If the platform 106 is in a position between the extracted position and the inserted position, the light barrier 174 may operate an alert so as to inform the user on this intermediate position.

Then, the lift 102 raises such that the barcodes 170 of each of the part racks 104 pass the scanner 168 in a subsequent order. Thus, the identity and/or authenticity of the part racks 104 are detected. It has to be noted that the preventing members 114 of the first rack separator 112 are located or moved away from one another such that the stack of part racks 104 is allowed to pass therethrough. After the identity and/or authenticity of each of the part racks 104 have been detected, the lift 102 is raised to a position to the part take-out station 108 where the uppermost part 104 passes the preventing members 114. Then the preventing members 114 are moved towards one another such that the preventing members 114 engage the protrusions 134 at the lower rim 132 of the uppermost part rack 104. Subsequently, the lift 102 is lowered while the preventing members 114 are still narrowed towards one another and engage the protrusions 134 at the lower rim 132 of the uppermost part rack 104. Thus, the uppermost part rack 104 is separated from the remaining part racks 104 located on the platform 106 as shown in FIG. 3. Thereafter, the takeout device 148 takes out the disposable parts from the uppermost part rack 104 in the part takeout station 108 in a subsequent order. For this purpose, the take-out device 148 moves within a plane perpendicular to the direction in which the lift 102 moves.

After all disposable parts have been taken out from the uppermost part rack 104 by means of the take-out device 148, the lift 102 raises again and the preventing members 114 of the first rack separator 112 are moved away from one another. Needless to say, the lift 102 may raise with some disposable parts still present in the uppermost part rack 104, such as when the take-out device 148 was not capable to take out all of the disposable parts. Thus, the uppermost part rack 104 is disposed on the stack of part racks 104 again. The lift 102 further raises to the rack recovery station 110. The force of the lift 102 is sufficient that the hindering members 146 of the second rack separator 144 increase the interval therebetween against the biasing force of the springs 147 when the uppermost part rack 104 is raised to the rack recovery station 110 as shown in FIG. 7. Particularly, the part rack 104 opens the hindering members 146 in a direction away from one another against the biasing force of the springs 147 when passing between the hindering members 146. After the uppermost part rack 104 has passed between the hindering members 146, the interval between the hindering members 146 decreases due to the biasing force of the springs 147 and the hindering members 146 engage the lower rim 132 of the uppermost part rack 104 as shown in FIG. 8. The lift 102 is lowered whereby the uppermost part rack 104 is separated from the remaining part racks 104 on the platform 106 as shown in FIG. 9. Thus, the hindering members 146, which are moveable in a direction perpendicular to a direction in which the lift 102 is moveable, hinder the uppermost part rack 104 from lowering.

The lift 102 is lowered to the part take-out station 108 where the first rack separator 112 moves the preventing members 114 to move towards one another so as to engage the protrusions 134 at the lower rim 132 of the second part rack 102 from the top as shown in FIG. 10. Subsequently, the lift 102 further lowers. Thus, the second part rack 104 from the top is separated from the remaining part racks 104 on the platform 104. As further shown in FIG. 10, the uppermost part racks 104 is stored in the rack recovery station 110. Thereafter, the take-out device 148 takes out the disposable parts from the second part rack 104 from the top in the part take-out station 108 in a subsequent order. For this purpose, the take-out device 148 moves within a plane perpendicular to the direction in which the lift 102 moves.

After all disposable parts have been taken out from the second part rack 104 from the top by means of the take-out device 148, the lift 102 raises again and the preventing members 114 of the first rack separator 112 are moved away from one another. Needless to say, the lift 102 may raise with some disposable parts still present in the uppermost part rack 104, such as when the takeout device 148 was not capable to take out all of the disposable parts. Thus, the second part rack 104 from the top is disposed on the stack of part racks 104 again. The lift 102 further raises to the rack recovery station 110. The force of the lift 102 is sufficient that the hindering members 146 of the second rack separator 144 increase the interval therebetween against the biasing force of the springs 147 when the second part rack 104 is raised to the rack recovery station 110. Particularly, the part rack 104 opens the hindering members 146 in a direction away from one another against the biasing force of the springs 147 when passing between the hindering members 146. After the second part rack 104 has passed between the hindering members 146, the interval between the hindering members 146 decreases due to the biasing force of the springs 147 and the hindering members 146 engage the lower rim 132 of the second part rack 104 from the top. The lift 102 is lowered whereby the second part rack 104 from the top is separated from the remaining part racks 104 on the platform 106. Thus, the hindering members 146, which are moveable in a direction perpendicular to a direction in which the lift 102 is moveable, hinder the uppermost part rack 104 from lowering.

Figure 14:
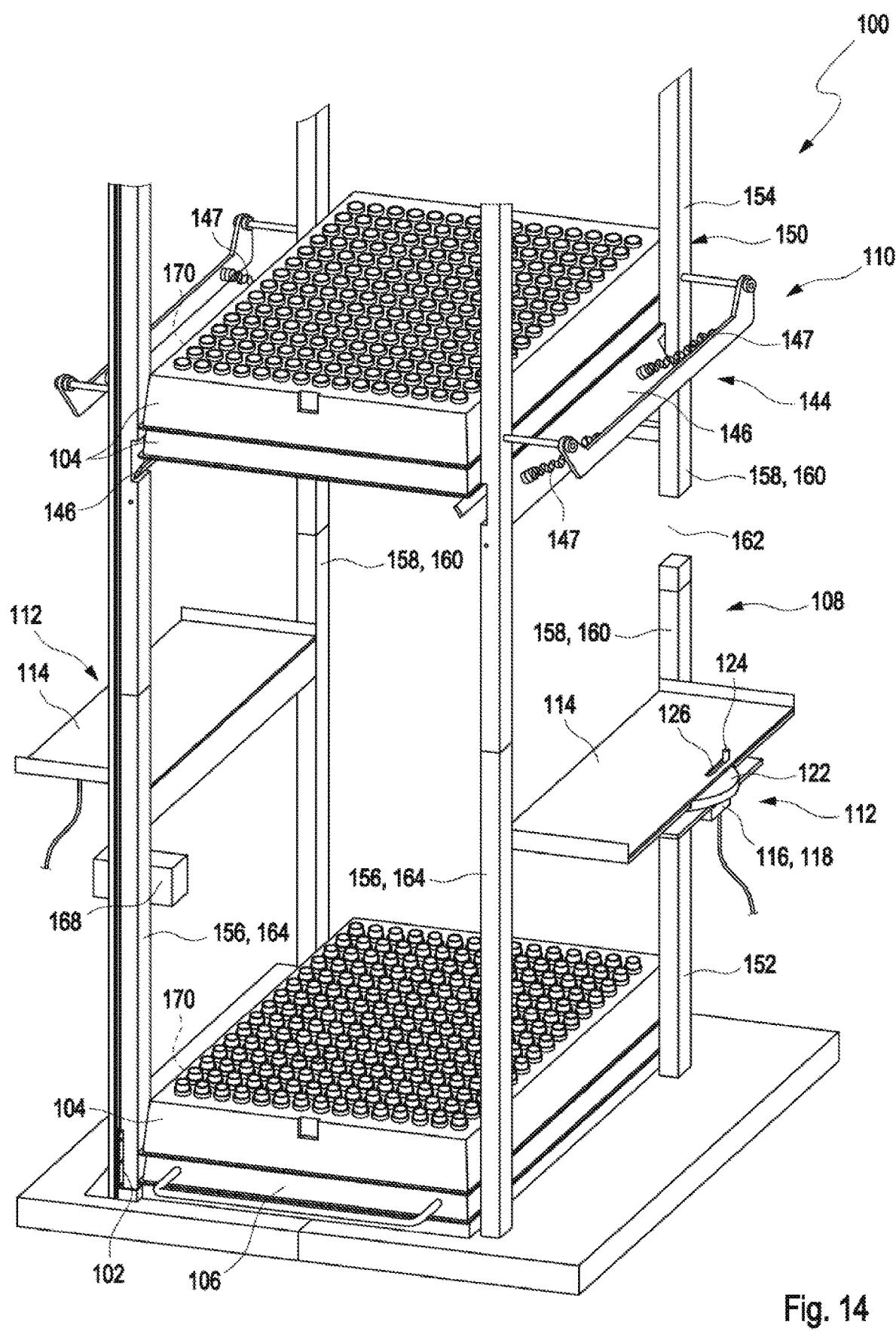
FIG. 14 shows a perspective view of the automatic analyzer.

FIG. 14 shows a perspective view of the automatic analyzer 100. As shown in FIG. 14, the uppermost part rack 104 is disposed on the second part rack 104 from the top within the rack recovery station 110. Then, the above operation is repeated until all part racks 104 are processed as described before and stored in the rack recovery station 110. After the rack recovery station 110 is filled with used part racks 104 or before that, the stack of used part racks 104 may be removed as the upper frame portion 154 allows access to the stack of used part racks 104. For example, the operator removes a lid (not shown in detail) covering the upper frame portion 154 so as to have access to the stack of used part racks 104. Then, the lift 102 is moved to its lowermost position, the drawer device 166 moves the platform 106 to the extracted position and the platform 106 may be loaded again with unused part racks 104. Basically, the lift 102 lowers after having disposed a part rack 104 at the part take-out station 108 and the rack recovery station 110, respectively, so as to leave the part take-out station 108 and the rack recovery station 110, respectively. Alternatively, the lift 102 may lower to the lowermost position after having disposed a part rack 104 at the part take-out station 108 and the rack recovery station 110, respectively, so as to leave the part take-out station 108 and the rack recovery station 110, respectively.

Figure 15:
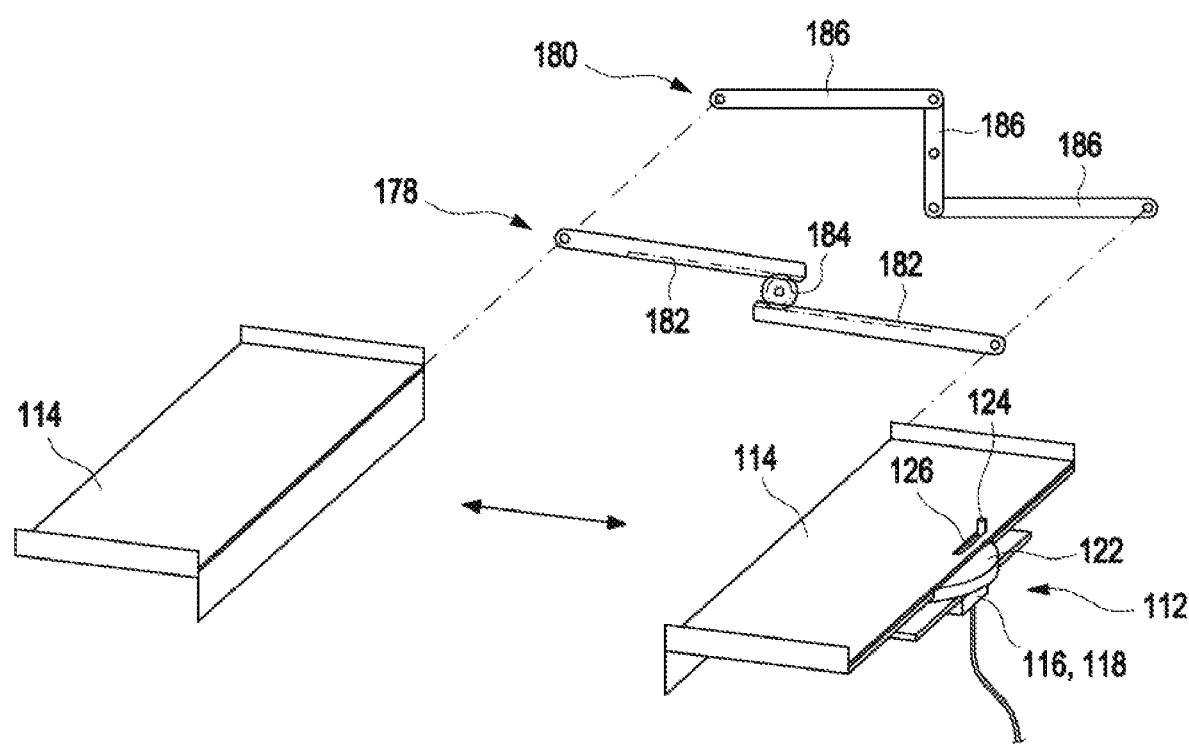
FIG. 15 shows a perspective view of two linkage mechanisms of the first or second rack separator.

FIG. 15 shows a perspective view of two linkage mechanisms 178, 180 of the first or second rack separator 112, 144. Both linkage mechanisms 178, 180 may be used with the first and/or second rack separator 112, 144.

The first linkage mechanism 178 shown in the upper part of FIG. 15 comprises two gear racks 182 and a gear wheel 184 engaging the gear racks 182. Each of the gear racks 182 is connected to one of the preventing members 114 and/or the hindering members 146. The gear wheel 184 is connected to a single drive such as the drive mechanism 116. As the drive rotates the gear wheel 184 which in turn moves the gear racks 184 relative to one another. As the gear racks 182 are connected to the preventing members 114 and/or the hindering members 146, these are moved due to the movement of the gear racks 182. Thus a single drive is sufficient for moving both preventing members 114 and/or hindering members 146.

The second linkage mechanism 180 shown in the middle part of FIG. 15 comprises levers 186 such as three levers 186 pivotally connected to one another. Further, each of the outer levers 186 is connected to one of the preventing members 114 and/or the hindering members 146. One of the preventing members 114 and/or the hindering members 146 is connected to a single drive such as the drive mechanism 116. As the drive moves this preventing member 114 and/or hindering member 146, the levers 186 pivot relative to one another and move the preventing member 114 and/or hindering member 146 not connected to the drive. Thus a single drive is sufficient for moving both preventing members 114 and/or hindering members 146.

LIST OF REFERENCE NUMBERS 100 automatic analyzer
102 lift
104 part rack
106 platform
108 part take-out station
110 rack recovery station
112 first rack separator
114 preventing members
116 drive mechanism
118 motor
120 driving shaft
122 disc
124 pin
126 slot
130 side wall
132 lower rim
134 protrusion
136 rack positioning device
138 positioning recess
140 edge
142 positioning member
144 second rack separator
146 hindering member
147 spring
148 take-out device 150 frame
152 lower frame portion
154 upper frame portion
156 front end
158 rear end
160 lift guiding rod
162 interruption
164 guiding rod
166 drawer device
168 scanner
170 barcode
172 position detecting device
174 light barrier
176 flag
178 first linkage mechanism
180 second linkage mechanism
182 gear rack
184 gear wheel
186 lever

What is claimed is:

1. An automatic analyzer for analyzing samples using disposable parts, comprising a lift, a part take-out station and a rack recovery station, wherein the rack recovery station is arranged above the part take-out station, wherein the lift is configured to raise and lower a plurality of stacked part racks to the part take-out station while keeping the plurality of stacked part racks together and to the rack recovery station while keeping the plurality of stacked part racks together, wherein the part take-out station comprises a first rack separator configured to prevent an uppermost one of the plurality of stacked part racks from being lowered when said lift lowers, while allowing the other of the plurality of stacked part racks to lower, so that the uppermost one of the plurality of stacked part racks is separated from the other of the plurality of stacked part racks so as to remain in the part take-out station, wherein the rack recovery station comprises a second rack separator configured to prevent the uppermost one of the plurality of stacked part racks from being lowered when said lift lowers, while allowing the other of the plurality of stacked part racks to lower, so that the uppermost one of the plurality of stacked part racks is separated from the other of the plurality of stacked part racks so as to remain in the rack recovery station, wherein the automatic analyzer comprises a part take-out device located at the part take-out station and configured to take out a disposable part from a part rack, wherein the automatic analyzer comprises a frame configured to guide the lift that includes a lower frame portion configured to support the part take-out station and the second rack separator of the rack recovery station and an upper frame portion connected to the lower frame portion, wherein the lift comprises a platform on which the plurality of stacked part racks are disposable, wherein the automatic analyzer comprises a drawer device configured to linearly move the platform in a lowermost position of the lift between an inserted position, in which the platform is located within the frame, and an extracted position, in which the platform is located outside from the frame, and wherein the platform is configured to retract from the lift.

2. The automatic analyzer according to claim 1, wherein the first rack separator comprises a pair of opposing preventing members configured to prevent the uppermost one of the plurality of stacked part racks from being lowered when said lift lowers.

3. The automatic analyzer according to claim 2, further comprising a drive mechanism configured to concertedly move the preventing members.

4. The automatic analyzer according to claim 1, further comprising a rack positioning device configured to position a part rack during a take out of a disposable part at the part take-out station.

5. The automatic analyzer according to claim 1, wherein the second rack separator has a pair of hindering members configured to hinder the uppermost one of the plurality of stacked part racks from lowering, and the hindering members are configured to operate such that an interval therebetween increases when the uppermost one of the plurality of stacked part racks is raised to the rack recovery station and decreases after the uppermost one of the plurality of stacked part racks has passed by the position of the pair of hindering members and before a second part rack from the top passes by the position of the pair of hindering members.

6. The automatic analyzer according to claim 1, wherein the second rack separator has a pair of hindering members configured to hinder the uppermost one of the plurality of stacked part racks from lowering, moveable in a direction perpendicular to a direction in which the lift is moveable.

7. The automatic analyzer according to claim 1, wherein the second rack separator has two hindering members configured to hinder the uppermost one of the plurality of stacked part racks from lowering and a spring configured to bias one of the hindering members in a direction towards one another, wherein the second rack separator further comprises a coupling mechanism configured to couple the hindering members such that a movement of the hindering member biased by the spring causes the other hindering member to concertedly move towards and/or away from the hindering member biased by the spring.

8. The automatic analyzer according to claim 1, wherein the frame comprises a front end from which the plurality of stacked part racks are loadable onto the lift and a rear end opposite to the front end, wherein the frame comprises at least one guiding rod for guiding the lift arranged at a corner of the lift at the front end or the rear end, wherein the frame comprises an interruption at the rear end at a position defined by the part take-out station.

9. The automatic analyzer according to claim 1, further comprising a scanner configured to detect an identity of a part rack.

10. The automatic analyzer according to claim 9, wherein the scanner is a RFID reader configured to detect the identity of the part rack by means of a RFID tag attached to the part rack.

11. The automatic analyzer according to claim 9, wherein the scanner is a barcode reader configured to detect the identity of the part rack by means of a barcode located at the part rack.

12. The automatic analyzer according to claim 1, wherein the lift is configured to raise the plurality of stacked part racks to the rack recovery station after at least some of the disposable parts of a part rack have been taken-out in the part take-out station.

* * * * *